(12) United States Patent
Attar et al.

(10) Patent No.: US 8,094,623 B2
(45) Date of Patent: Jan. 10, 2012

(54) METHOD AND APPARATUS FOR CHOOSING A SECTOR BASED ON A SCALED FORWARD LINK METRIC

(75) Inventors: Rashid Ahmed Akbar Attar, San Diego, CA (US); Rajiv Vijayan, San Diego, CA (US); Roberto Padovani, San Diego, CA (US); Naga Bhushan, San Diego, CA (US); Qiang Wu, San Diego, CA (US); Peter John Black, San Diego, CA (US); Eduardo A. S. Esteves, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 422 days.

(21) Appl. No.: 11/686,772

(22) Filed: Mar. 15, 2007

(65) Prior Publication Data

US 2007/0153687 A1 Jul. 5, 2007

Related U.S. Application Data

(63) Continuation of application No. 09/915,736, filed on Jul. 26, 2001, now Pat. No. 7,239,847, and a continuation-in-part of application No. 09/892,378, filed on Jun. 26, 2001, now Pat. No. 6,757,520.

(51) Int. Cl.
*H04W 36/08* (2009.01)
(52) U.S. Cl. ................ 370/332; 455/436; 455/437
(58) Field of Classification Search .................. 370/331, 370/332; 455/436, 437
See application file for complete search history.

(56) References Cited

U.S. PATENT DOCUMENTS

| | | | |
|---|---|---|---|
| 4,477,809 A | 10/1984 | Bose | |
| 4,670,899 A | 6/1987 | Brody et al. | |
| 4,718,081 A * | 1/1988 | Brenig | 455/438 |
| 4,901,307 A | 2/1990 | Gilhousen et al. | |
| 5,056,109 A | 10/1991 | Gilhousen et al. | |
| 5,103,459 A | 4/1992 | Gilhousen et al. | |

(Continued)

FOREIGN PATENT DOCUMENTS

CN 1237074 12/1999

(Continued)

OTHER PUBLICATIONS

"cdma2000 High Data Rate Packet Data Air Interface Specification-Addendum 1" TIA/EIA Interim Standard TIA/EIA/IS-856-1 (Jan. 2002); pp. 9-54; Sep. 1966-Sep. 1968.

(Continued)

*Primary Examiner* — Huy Vu
*Assistant Examiner* — Benjamin Lamont
(74) *Attorney, Agent, or Firm* — Kristine U. Ekwueme; Abdollah Katbab

(57) ABSTRACT

Methods and apparatus for selecting a serving sector in a high rate data (HDR) communication system are disclosed. An exemplary HDR communication system defines a set of data rates, at which a sector of an Access Point may send data packets to an Access Terminal. The sector is selected by the Access Terminal to achieve the highest data throughput while maintaining a targeted packet error rate. The Access Terminal employs various methods to evaluate quality metrics of forward and reverse links from and to different sectors, and uses the quality metrics to select the sector to send data packets to the Access Terminal.

18 Claims, 15 Drawing Sheets

U.S. PATENT DOCUMENTS

| | | | |
|---|---|---|---|
| 5,267,261 A | | 11/1993 | Blakeney, II et al. |
| 5,428,818 A | | 6/1995 | Meidan et al. |
| 5,504,733 A | | 4/1996 | Nakamichi |
| 5,504,773 A | | 4/1996 | Padovani et al. |
| 5,509,051 A | * | 4/1996 | Barnett et al. ............... 455/443 |
| 5,584,049 A | | 12/1996 | Weaver et al. |
| 5,590,126 A | | 12/1996 | Mishra et al. |
| 5,613,205 A | * | 3/1997 | Dufour ........................ 455/440 |
| 5,722,044 A | | 2/1998 | Padovani et al. |
| 5,812,540 A | | 9/1998 | Bruckert et al. |
| 5,886,988 A | | 3/1999 | Yun et al. |
| 5,903,840 A | | 5/1999 | Bertacchi |
| 5,933,462 A | | 8/1999 | Viterbi et al. |
| 5,933,787 A | | 8/1999 | Gilhousen et al. |
| 5,960,349 A | | 9/1999 | Chheda et al. |
| 5,987,326 A | | 11/1999 | Tiedemann et al. |
| 5,999,522 A | | 12/1999 | Rohani |
| 5,999,811 A | * | 12/1999 | Molne ........................ 455/432.3 |
| 6,061,337 A | | 5/2000 | Light et al. |
| 6,070,090 A | | 5/2000 | Feuerstein |
| 6,085,108 A | | 7/2000 | Knutsson et al. |
| 6,160,999 A | | 12/2000 | Chheda et al. |
| 6,205,129 B1 | | 3/2001 | Esteves et al. |
| 6,229,795 B1 | | 5/2001 | Pankaj et al. |
| 6,233,455 B1 | | 5/2001 | Ramakrishna et al. |
| 6,266,529 B1 | | 7/2001 | Chheda et al. |
| 6,389,474 B1 | | 5/2002 | Chien et al. |
| RE37,757 E | * | 6/2002 | Frank et al. ................... 455/428 |
| 6,480,479 B1 | | 11/2002 | Miya et al. |
| 6,487,191 B1 | * | 11/2002 | Kang et al. ..................... 370/342 |
| 6,504,828 B1 | | 1/2003 | Corbett et al. |
| 6,512,933 B1 | | 1/2003 | Kalofonos et al. |
| 6,564,057 B1 | * | 5/2003 | Chun et al. ..................... 455/437 |
| 6,571,211 B1 | | 5/2003 | Dwyer et al. |
| 6,647,053 B1 | * | 11/2003 | Garces ........................ 375/132 |
| 6,690,939 B1 | * | 2/2004 | Jonsson et al. ................ 455/453 |
| 6,735,241 B1 | * | 5/2004 | Fujita ........................... 375/149 |
| 6,741,582 B1 | | 5/2004 | Mansour |
| 6,745,051 B1 | | 6/2004 | Bassirat et al. |
| 6,757,520 B2 | | 6/2004 | Attar et al. |
| 6,785,559 B1 | | 8/2004 | Goldberg et al. |
| 6,876,866 B1 | | 4/2005 | Ulupinar et al. |
| 7,069,033 B1 | * | 6/2006 | Moon et al. .................. 455/522 |
| 7,173,918 B2 | * | 2/2007 | Awater et al. ................. 370/332 |
| 2002/0111169 A1 | | 8/2002 | Vanghi |

FOREIGN PATENT DOCUMENTS

| | | | |
|---|---|---|---|
| CN | 1280747 | | 1/2001 |
| EP | 0905920 | | 3/1999 |
| GB | 2301733 | * | 5/1995 |
| JP | 09-507115 | | 7/1997 |
| JP | 2000-101596 | | 4/2000 |
| JP | 2001-069549 | | 3/2001 |
| WO | 9512297 | | 5/1995 |
| WO | 9830043 | | 7/1998 |
| WO | 9909550 | | 2/1999 |
| WO | 9923844 | | 5/1999 |
| WO | 0038456 | | 6/2000 |
| WO | 0079809 | | 12/2000 |

OTHER PUBLICATIONS

International Search Report—PCT/US02/20160, International Search Authority-European Patent Office, May 11, 2002.

Jalali A. et al., "Data Thoughput of CDMA-HDR a high efficiency-high data rate personal communication wireless system" VTC 2000-Sp 2000. IEEE 51st. Vehicular Technology Conference Proceedings, Tokyo, Japan. May 15-18. vol. 3 pp. 1854-1858 XP000968325.

* cited by examiner

METHOD AND APPARATUS FOR CHOOSING A SECTOR BASED ON A SCALED FORWARD LINK METRIC

CLAIM OF PRIORITY UNDER 35 U.S.C. §120

The present Application for Patent is a Continuation and claims priority to patent application Ser. No. 09/915,736, entitled "Method and Apparatus for Adaptive Server Selection in a Data Communication System," filed Jul. 26, 2001, now allowed, which is a continuation-in-part of U.S. Pat. No. 6,757,520, issued Jun. 29, 2004, entitled "Method and Apparatus for Selecting a Serving Sector in a Data Communication System," and currently assigned to the assignee of the present application.

BACKGROUND

1. Field

The present invention relates generally to communication systems, and more specifically to a method and an apparatus for selecting a serving sector in a data communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signals involve varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This HDR system is based on a communication system disclosed in U.S. Pat. No. 6,571,211, entitled "METHOD AND APPARATUS FOR HIGH RATE PACKET DATA TRANSMISSION," issued on Jun. 3, 2003, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

A significant difference between voice services and data services is the fact that the former imposes stringent and fixed delay requirements. Typically, the overall one-way delay of speech frames must be less than 100 ms. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," issued Aug. 3, 1999, assigned to the assignee of the present invention.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a pre-determined amount of data, hereinafter referred to as a data packet.

Yet another significant difference between voice services and data services is that the former requires a reliable communication link. When a mobile station, communicating with a first base station, moves to the edge of the associated cell or sector, the mobile station initiates a simultaneous communication with a second base station. This simultaneous communication, when the mobile station receives a signal carrying equivalent information from two base stations, termed soft handoff, is a process of establishing a communication link with the second base station while maintaining a communication link with the first base station. When the mobile station eventually leaves the cell or sector associated with the first base station, and breaks the communication link with the first base station, it continues the communication on the communication link established with the second base station. Because the soft handoff is a "make before break" mechanism, the soft handoff minimizes the probability of dropped calls. The method and system for providing a communication with a mobile station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention. Softer handoff is the process whereby the communication occurs over multiple sectors that are serviced by the same base station. The process of softer handoff is described in detail in U.S. Pat. No. 5,933,787, entitled "METHOD AND APPARATUS FOR PERFORMING HANDOFF BETWEEN SECTORS OF A COMMON BASE STATION", issued Aug. 3, 1999, assigned to the assignee of the present invention. Thus, both soft and softer handoff for voice services result in redundant transmissions from two or more base stations to improve reliability.

This additional reliability is not required for data transmission because the data packets received in error can be retransmitted. For data services, the parameters, which measure the quality and effectiveness of a data communication system, are the transmission delay required to transfer a data packet and the average throughput rate of the system. Transmission delay does not have the same impact in data communication as in voice communication, but the transmission delay is an important metric for measuring the quality of the data communication system. The average throughput rate is a measure of the efficiency of the data transmission capability of the communication system. Consequently, the transmit power and resources used to support soft handoff can be more efficiently used for transmission of additional data. To maximize the throughput, the transmitting sector should be chosen in a way that maximizes the forward link throughput as perceived by the AT.

There is, therefore, a need in the art for a method and an apparatus for selecting a sector in a data communication system that maximizes the forward link throughput as perceived by the AT.

SUMMARY

In one aspect of the invention, the above stated needs are addressed by determining at the remote station a forward link quality metric for each sector in the remote station's list, a quality related to a reverse link quality metric for each sector in the remote station's list; and directing communication between the remote station and one sector from the sectors in the remote station's list in accordance with said determined forward link quality metrics and said determined qualities related to a reverse link quality metric. The quality metric of a forward link for each sector in the remote station's list is determined by measuring a signal-to-noise-and-interference-ratio of the forward link. The quality related to a reverse link quality metric for each sector in the remote station's list is determined by ascertaining at the remote station a first signal value at a position in a first channel of the forward link for each sector in the remote station's list, and processing at the remote station said ascertained first signal value for the each sector in the remote station's list. The communication between the remote station and one sector from the sectors in the remote station's list in accordance with said determined forward link quality metrics and said determined qualities related to a reverse link quality metric by assigning credits to each sector in the remote station's list except a current serving sector in accordance with said determined forward link quality metrics and said determined qualities related to a reverse link quality metric, and directing communication between the remote station and one sector from the sectors in the remote station's list in accordance with said assigned credits.

In another aspect of the invention, the above stated needs are addressed by determining at the remote station a forward link quality metric for each sector in the remote station's list, a forward link de-rating value for at least one sector in the remote station's list, and directing communication between the remote station and one sector from the sectors in the remote station's list in accordance with said determined forward links quality metrics and said determined forward link de-rating value. The quality metric of a forward link for each sector in the remote station's list is determined by measuring a signal-to-noise-and-interference-ratio of the forward link. The forward link de-rating value for at least one sector in the remote station's list is determined by ascertaining at the remote station a first signal value at a position in a first channel of the forward link for the at least one sector in the remote station's list, processing at the remote station said ascertained first signal value for the at least one sector in the remote station's list, and determining at the remote station the forward link de-rating value in accordance with said processed first signal value for the at least one sector in the remote station's list. The communication between the remote station and one sector from the sectors in the remote station's list is directed by de-rating said determined forward link quality metrics in accordance with said determined forward link de-rating value, assigning credits to each sector in the remote station's list except the sector currently serving the remote station in accordance with said de-rated forward link quality metric and directing communication between the remote station and one sector from the sectors in the remote station's list in accordance with said assigned credits.

DETAILED DESCRIPTION

Definitions

Figure 1:
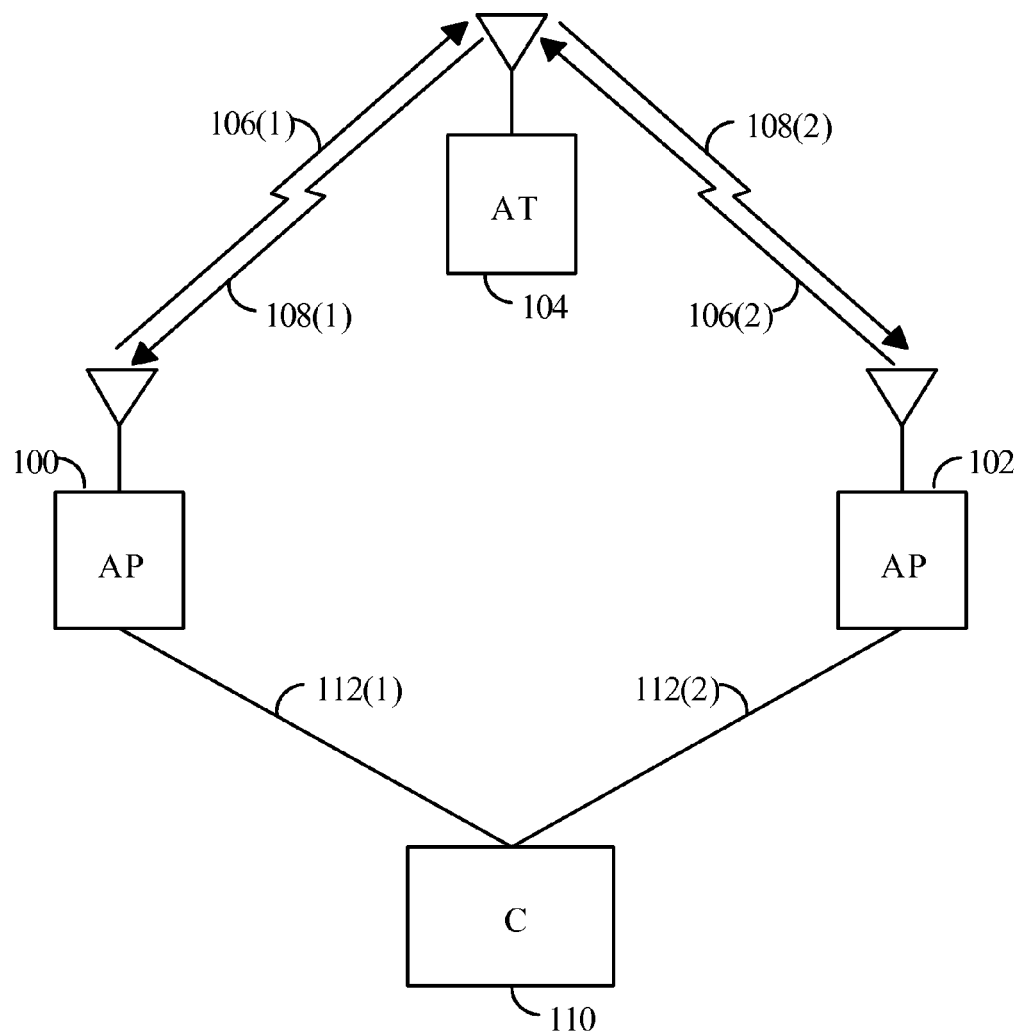
FIG. 1 illustrates a conceptual diagram of an HDR communication system.

The word "exemplary" as used herein means "serving as an example, instance, or illustration." Although a best mode embodiment is contained herein, an embodiment described as "exemplary" is not necessarily to be construed as preferred or advantageous over other embodiments.

The term packet as used herein means a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network as used herein means a collection of access points (AP) and one or more access point controllers. The access network transports data packets between multiple access terminals (AT). The access network may be further connected to additional networks outside the access network, such as a corporate Intranet or the Internet, and may transport data packets between each access terminal and such outside networks.

The term base station, referred to herein as an AP in the case of an HDR communication system, as used herein means the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, as used herein means the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link as used herein means a single route over which a signal is transmitted described in terms of modulation characteristics and coding, or a single route within the protocol layers of either the AP or the AT.

The term reverse channel/link as used herein means a communication channel/link through which the AT sends signals to the AP.

A forward channel/link is as used herein to mean a communication channel/link through which an AP sends signals to an AT.

The term soft handoff as used herein means a communication between a subscriber station and two or more sectors, wherein each sector belongs to a different cell. In the context of IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the AT.

The term softer handoff as used herein means a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the AT.

The term re-pointing as used herein means a selection of a sector that is a member of an ATs' active list, wherein the sector is different than a currently selected sector.

The term serving sector as used herein means a sector that a particular AT selected for data communication or a sector that is communicating data to the particular AT.

The term soft/softer handoff delay as used herein to indicate the minimum interruption in service that a subscriber station would experience following a handoff to another sector. Soft/Softer handoff delay is determined based on whether the sector, (currently not serving the subscriber station), (non-serving sector) to which the subscriber station is re-pointing is part of the same cell as the current serving sector. If the non-serving sector is in the same cell as the serving sector then the softer handoff delay is used, and if the non-serving sector is in a cell different from the one that the serving sector is part of then the soft handoff delay is used.

The term non-homogenous soft/softer handoff delay as used herein to indicate that the soft/softer handoff delays are sector specific and therefore may not uniform across the sectors of an Access Network.

The term credit as used herein means a dimensionless attribute indicating a reverse link quality metric, a quality metric of a forward link, or a composite quality metric of both forward and reverse links.

The term erasure as used herein means failure to recognize a message.

The term outage as used herein means a time interval during which the likelihood that a subscriber station will receive service is reduced.

The term fixed rate mode as used herein means that a particular sector transmits a Forward Traffic Channel to the AT at one particular rate.

DESCRIPTION

FIG. 1 illustrates a conceptual diagram of an HDR communication system capable of performing re-pointing in accordance with embodiments of the present invention, e.g., a communication system in accordance with the IS-856 standard. An AP 100 transmits data to an AT 104 over a forward link 106(1), and receives data from the AT 104 over a reverse link 108(1). Similarly, an AP 102 transmits data to the AT 104 over a forward link 106(2), and receives data from the AT 104 over a reverse link 108(2). In accordance with one embodiment, data transmission on the forward link occurs from one AP to one AT at or near the maximum data rate that can be supported by the forward link and the communication system. Other channels of the forward link, e.g., control channel, may be transmitted from multiple AP's to one AT. Reverse link data communication may occur from one AT to one or more AP's. The AP 100 and the AP 102 are connected to a controller 110 over backhauls 112(1) and 112(2). The term backhaul is used to mean a communication link between a controller and an AP. Although only two AP's and one AT are shown in FIG. 1, one of ordinary skill in the art recognizes that this is for pedagogical purposes only, and the communication system can comprise plurality of AT's and AP's.

Initially, the AT 104 and one of the AP's, e.g., the AP 100, establish a communication link using a pre-determined access procedure. In this connected state, the AT 104 is able to receive data and control messages from the AP 100, and is able to transmit data and control messages to the AP 100. The AT 104 continually searches for other AP's that could be added to the AT 104 active set. The active set comprises a list of the AP's capable of communication with the AT 104. When such an AP is found, the AT 104 calculates a quality metric of the AP's forward link, which in accordance with one embodiment comprises a signal-to-interference and-noise ratio (SINR). In accordance with one embodiment, the AT 104 searches for other APs and determines the AP's SINR in accordance with a pilot signal. Simultaneously, the AT 104 calculates the forward link quality metric for each AP in the AT 104 active set. If the forward link quality metric from a particular AP is above a pre-determined add threshold or below a pre-determined drop threshold for a pre-determined period of time, the AT 104 reports this information to the AP 100. Subsequent messages from the AP 100 direct the AT 104 to add to or to delete from the AT 104 active set the particular AP.

The AT 104 selects a serving AP from the active set based on a set of parameters. The set of parameters can comprise present and previous SINR measurements, a bit-error-rate and/or a packet-error-rate, and other parameters known to one skilled in the art. In accordance with one embodiment, the serving AP is selected in accordance with the largest SINR measurement. The AT 104 then transmits to the selected AP a data request message (DRC message) on the data request channel (DRC channel). The DRC message can contain the requested data rate or, alternatively, an indication of the quality of the forward link, e.g., the measured SINR, the bit-error-rate, or the packet-error-rate. In accordance with one embodiment, the AT 104 can direct the transmission of the DRC message to a specific AP by the use of a Walsh code, which uniquely identifies the specific AP. The DRC message symbols are exclusively OR'ed (XOR) with the unique Walsh code. The XOR operation is referred to as Walsh covering of a signal. Since each AP in the active set of the AT 104 is identified by a unique Walsh code, only the selected AP which performs the identical XOR operation as that performed by the AT 104 with the correct Walsh code can correctly decode the DRC message.

The data to be transmitted to the AT 104 arrive at the controller 110. In accordance with one embodiment, the controller 110 sends the data to all APs in the AT 104 active set over the backhaul 112. In another embodiment, the controller 110 first determines, which AP was selected by the AT 104 as the serving AP, and then sends the data to the serving AP. The data are stored in a queue at the AP(s). A paging message is then sent by one or more APs to the AT 104 on respective control channels. The AT 104 demodulates and decodes the signals on one or more control channels to obtain the paging messages.

At each time-slot, the AP can schedule data transmission to any of the ATs that received the paging message. An exemplary method for scheduling transmission is described in U.S. Pat. No. 6,229,795, entitled "SYSTEM FOR ALLOCATING RESOURCES IN A COMMUNICATION SYSTEM," assigned to the assignee of the present invention. The AP uses the rate control information received from each AT in the DRC message to efficiently transmit forward link data at the highest possible rate. In accordance with one embodiment, the AP determines the data rate at which to transmit the data to the AT 104 based on the most recent value of the DRC message received from the AT 104. Additionally, the AP uniquely identifies a transmission to the AT 104 by using a spreading code which is unique to that mobile station. In the exemplary embodiment, this spreading code is the long pseudo noise (PN) code, which is defined by the IS-856 standard.

The AT 104, for which the data packet is intended, receives the data transmission and decodes the data packet. In accordance with one embodiment, each data packet is associated with an identifier, e.g., a sequence number, which is used by the AT 104 to detect either missed or duplicate transmissions. In such an event, the AT 104 communicates via the reverse link data channel the sequence numbers of the missing data units. The controller 110, which receives the data messages from the AT 104 via the AP communicating with the AT 104, then indicates to the AP what data units were not received by the AT 104. The AP then schedules a retransmission of such data units.

When the communication link between the AT 104 and the AP 100, operating in the variable rate mode, deteriorates below required reliability level, the AT 104 first attempts to determine whether communication with another AP in the variable rate mode supporting an acceptable rate data is possible. If the AT 104 ascertains such an AP (e.g., the AP 102), a re-pointing to the AP 102, therefore, to a different communication link occurs, and the data transmissions continue from the AP 102 in the variable rate mode. The above-mentioned deterioration of the communication link can be caused by, e.g., the AT 104 moving from a coverage area of the AP 100 to the coverage area of the AP 102, shadowing, fading, and other reasons known to one skilled in the art. Alternatively, when a communication link between the AT 104 and another AP (e.g., the AP 102) that may achieve higher throughput rate than the currently used communication link becomes available, a re-pointing to the AP 102, therefore, to a different communication link occurs, and the data transmissions continue from the AP 102 in the variable rate mode. If the AT 104 fails to detect an AP that can operate in the variable rate mode and support an acceptable data rate, the AT 104 transitions into a fixed rate mode.

In accordance with one embodiment, the AT 104 evaluates the communications links with all candidate APs for both variable rate data and fixed rate data modes, and selects the AP, which yields the highest throughput.

The AT 104 will switch from the fixed rate mode back to the variable rate mode if the sector is no longer a member of the AT 104 active set.

In the exemplary embodiment, the above described fixed rate mode and associated methods for transition to and from the fixed mode are similar to those disclosed in detail in U.S. Pat. No. 6,205,129, entitled "METHOD AND APPARATUS FOR VARIABLE AND FIXED FORWARD LINK RATE CONTROL IN A MOBILE RADIO COMMUNICATION SYSTEM," assigned to the assignee of the present invention. Other fixed rate modes and associated methods for transition to and from the fixed mode can also be contemplated and are within the scope of the present invention.

One skilled in the art recognizes that an AP can comprise one or more sectors. In the description above, the term AP was used generically to allow clear explanation of basic concepts of the HDR communication system. However, one skilled in the art can extend the explained concepts to AP comprising any number of sectors. Consequently, the concept of sector will be used throughout the rest of the document.

Forward Link Structure

Figure 2:
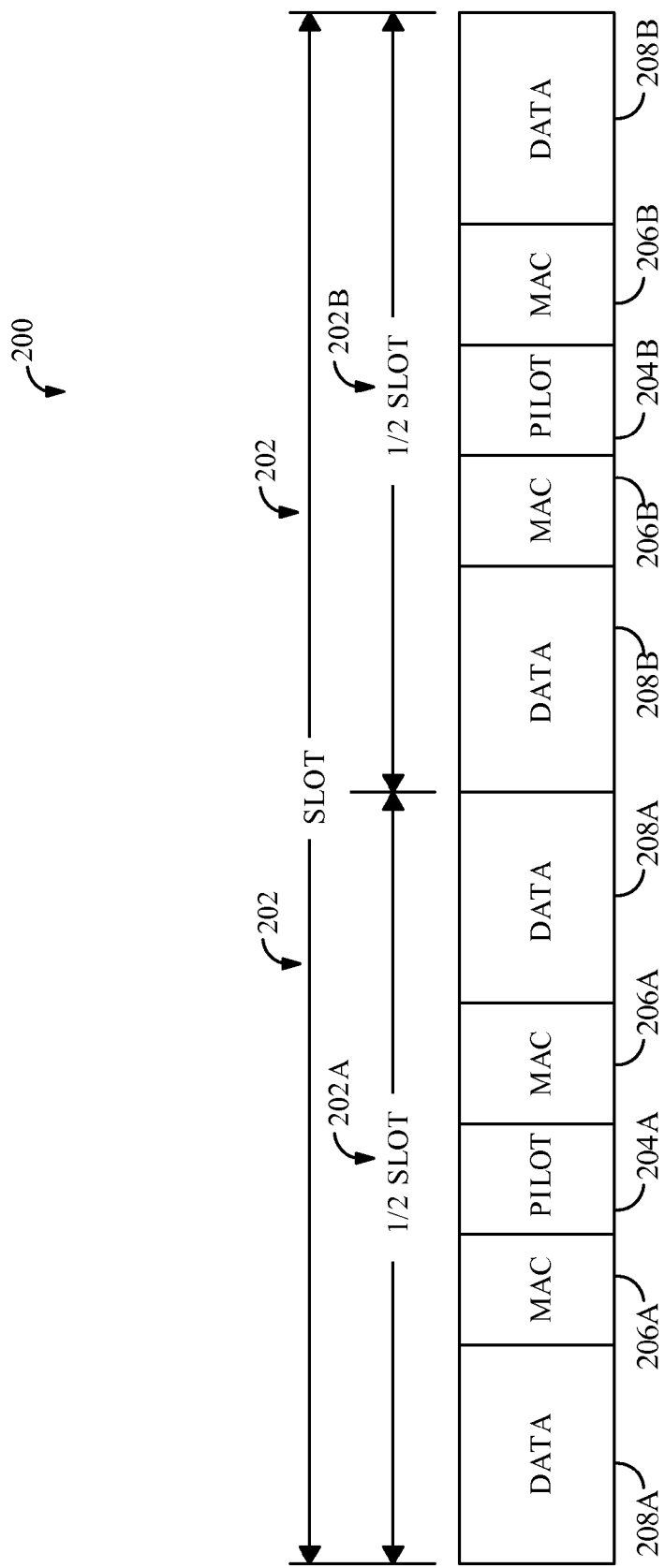
FIG. 2 illustrates an exemplary forward link waveform.

FIG. 2 illustrates an exemplary forward link waveform 200. For pedagogical reasons, the waveform 200 is modeled after a forward link waveform of the above-mentioned HDR system. However, one of ordinary skill in the art will understand that the teaching is applicable to different waveforms. Thus, for example, in accordance with one embodiment the waveform does not need to contain pilot signal bursts, and the pilot signal can be transmitted on a separate channel, which can be continuous or bursty. The forward link 200 is defined in terms of frames. A frame is a structure comprising 16 time-slots 202, each time-slot 202 being 2048 chips long, corresponding to a 1.66 ms. time-slot duration, and, consequently, a 26.56 ms. frame duration. Each time-slot 202 is divided into two half-time-slots 202A, 202B, with pilot bursts 204A, 204B transmitted within each half-time-slot 202A, 202B. In the exemplary embodiment, each pilot burst 204A, 204B is 96 chips long, and is centered at the mid-point of its associated half-time-slot 202A, 202B. The pilot bursts 204A, 204B comprise a pilot channel signal covered by a Walsh cover with index 0. A forward medium access control channel (MAC) 206 forms two bursts, which are transmitted immediately before and immediately after the pilot burst 204 of each half-time-slot 202. In the exemplary embodiment, the MAC is composed of up to 64 code channels, which are orthogonally covered by 64-ary Walsh codes. Each code channel is identified by a MAC index, which has a value between 1 and 64, and identifies a unique 64-ary Walsh cover. A reverse power control channel (RPC) is used to regulate the power of the reverse link signals for each subscriber station. One of the available MAC indices between 5 and 63 is used for reverse link power control for each subscriber station. MAC index 4 is used for a reverse activity channel (RA), which performs load control on the reverse traffic channel. The forward link traffic channel and control channel payload is sent in the remaining portions 208A of the first half-time-slot 202A and the remaining portions 208B of the second half-time-slot 202B.

Re-pointing Based on RPC—Introduction

In accordance with one embodiment, a re-pointing decision is made by an AT in accordance with conditions of a forward link and a reverse link. As described above, the AT determines a forward link quality metric directly, e.g., by measuring the forward link SINR. Similarly, a reverse link quality metric may comprise, e.g., a reverse link SINR, a bit-error-rate and/or a packet-error-rate or a DRC erasure rate.

As discussed, the AT identifies a serving sector of a particular sector and transmits a DRC message on a DRC channel on a reverse link. The reverse link carrying the DRC messages between the AT and the serving sector is subject to various factors that change characteristics of a communication channel through which the DRC messages travel. In wireless communication systems, these factors comprise, but are not limited to: fading, noise, interference from other terminals, and other factors known to one of ordinary skill in the art. The DRC message is protected against the changing characteristics of the communication channel by various methods, e.g., message length selection, encoding, symbol repetition, interleaving, transmission power, and other methods know to one of ordinary skill in the art. However, these methods impose performance penalties, e.g., increased overhead, thus, decreased throughput, increased power consumption, increased peak-to-average power, increased power amplifier back-off, more expensive power amplifiers, and other penalties known to one skilled in the art. Therefore, an engineering compromise between a reliability of message delivery and an amount of overhead must be made. Consequently, the conditions of the communication channel can degrade to the point at which the serving sector possibly cannot decode (erases) some of the DRC messages. Therefore, the DRC erasure rate is directly related to the conditions affecting the reverse link, and the DRC erasure rate is a good quality metric of the reverse link. A method and an apparatus utilizing the DRC erasure rate are disclosed in detail in U.S. Pat. No. 6,757,520, entitled "METHOD AND APPARATUS FOR SELECTING A SERVING SECTOR IN A DATA COMMUNICATION SYSTEM," issued Jun. 29, 2004, and assigned to the assignee of the present invention.

However, the AT can directly determine neither the reverse link SINR nor the DRC erasure rate. Both the reverse link SINR and the DRC erasure rate may be directly determined by the sectors in the AT active set. The sector(s) then supplies the AT with the determined values of the reverse link SINR or the DRC erasure rate via a feedback loop. Because the feedback loop from the sector(s) to the AT introduces a delay, depending on an implementation of a communication system, a performance of a re-pointing using such a feedback for indication of a reverse link condition may suffer due to the delay. Therefore, in accordance with one embodiment, the AT uses indirect method of ascertaining the reverse link quality metric utilizing RPC commands.

The AT then uses the reverse link quality metric together with the forward link quality metric to make a re-pointing decision. Consequently, the AT must be able to generate the forward link quality metric and the reverse link quality metric.

Forward Link Quality Metric Generation

In accordance with one embodiment, an AT obtains a forward link quality metric for each sector in the AT's active set, e.g., SINR, by measuring the pilot signal associated with each of the sectors. In accordance with one embodiment, described with reference to FIG. 2, the pilot signal is sent in two bursts centered in each half-slot and the measurement is carried out (updated) in every time slot. The AT computes the updated value of a SINR by processing the pilot signal. In accordance with one embodiment, the processing comprises filtering by a filter with a pre-determined time constant. In accordance with one embodiment, the filter is realized in a digital domain. The value of the pre-determined time constant is established in accordance with system simulation, by experiment or other engineering methods known to one of ordinary skills in the art as an optimum in accordance with:

reliability of the SINR estimate ensuing from a choice of the time constant, and latency of the SINR estimate ensuing from a choice of the time constant.

In accordance with one embodiment, the pre-determined time constant is 4 time-slots. However, different implementation and design criteria may yield different values of the time constant.

Reverse Link Quality Metric Generation

On the reverse link, each transmitting AT acts as a source of interference to all other ATs in the communication system. To minimize interference on the reverse link and maximize capacity, transmit power of each AT is controlled by three power control loops (Open Loop, Closed Loop and Outer Loop). In the exemplary embodiment, the power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM," and in U.S. Pat. No. 6,876,866, entitled "MULTI-STATE POWER CONTROL MECHANISM FOR A WIRELESS COMMUNICATION SYSTEM," issued Apr. 5, 2005, both assigned to the assignee of the present invention. Other power control mechanism can also be contemplated and are within the scope of the present invention. In the present invention, each sector receiving reverse link from particular ATs transmits RPC bits to each of such ATs on a power control channel of the sector's forward link. In the exemplary embodiment, the power control channel is similar to that of the HDR system disclosed in detail in the IS-856 standard. Other power control channels can also be contemplated and are within the scope of the present invention. In the exemplary embodiment, the power control channel comprises up to 64 orthogonal channels, which are spread with 16-chip Walsh covers. Each power-channel transmits one RPC bit at periodic intervals. Each active AT is assigned an RPC index which defines the Walsh cover and QPSK modulation phase (e.g., in-phase or quadrature) for transmission of the RPC bit stream destined for that AT. Because the RPC bits correlate to a condition of the reverse link as determined by a sector, the RPC bits are used by the AT to estimate the reverse link quality metric.

In every time slot, a value of the RPC bit is determined at an AT for each sector in the AT's active set. The AT computes an updated value of an RPC estimate by processing the received RPC bits. In accordance with one embodiment, the processing comprises filtering by a filter with a pre-determined time constant. In accordance with one embodiment, the filter is realized in a digital domain. The value of the pre-determined time constant is established in accordance with system simulation, by experiment or other engineering methods known to one of ordinary skills in the art as an optimum in accordance with:

reliability of the RPC estimate ensuing from a choice of the time constant, and latency of the RPC estimate ensuing from a choice of the time constant.

In accordance with one embodiment, pre-determined time constant is 128 time slots. However, different implementation and design criteria may yield different values of the time constant.

Figure 3:
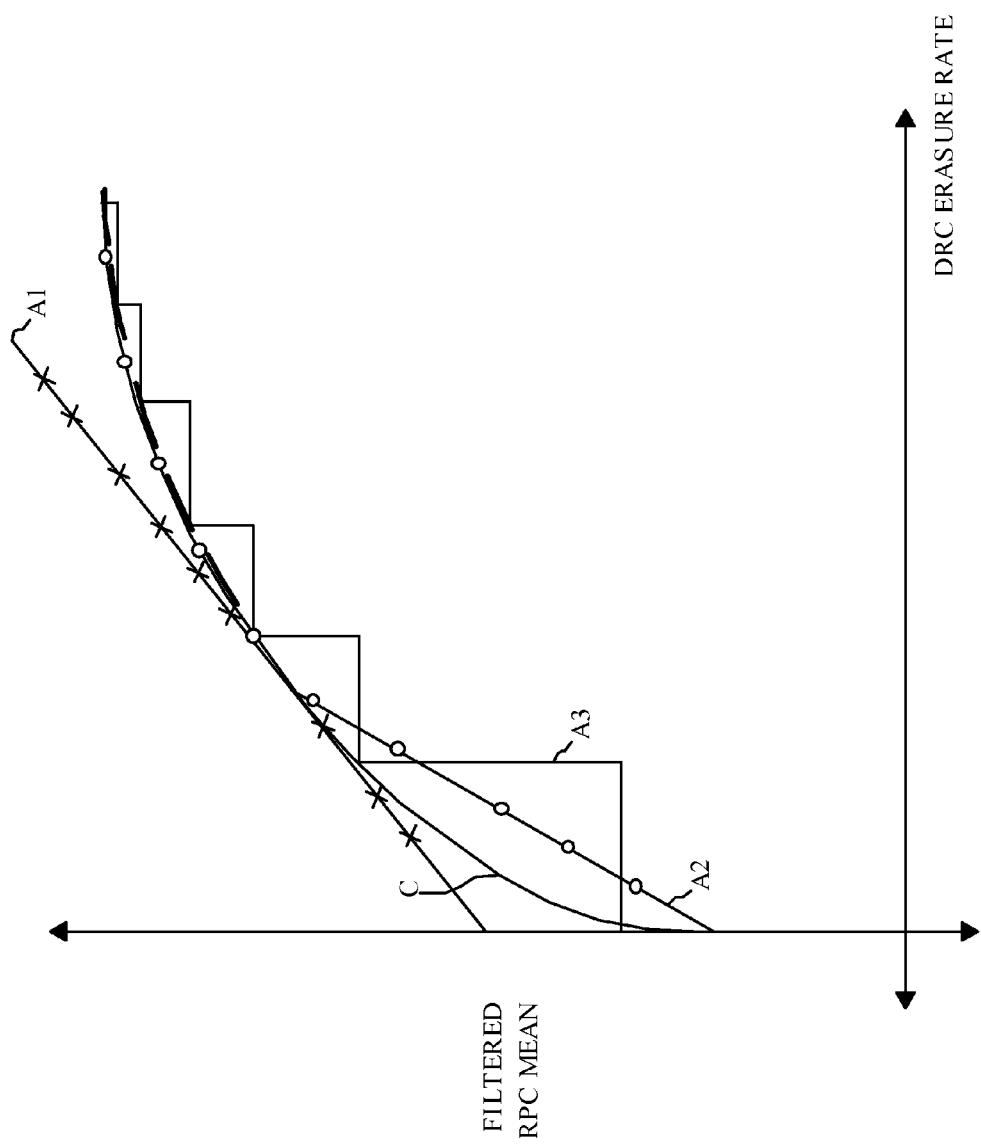
FIG. 3 illustrates a typical relationship between filtered RPC mean and a DRC erasure rate for a slow fading communication channel.
Figure 4:
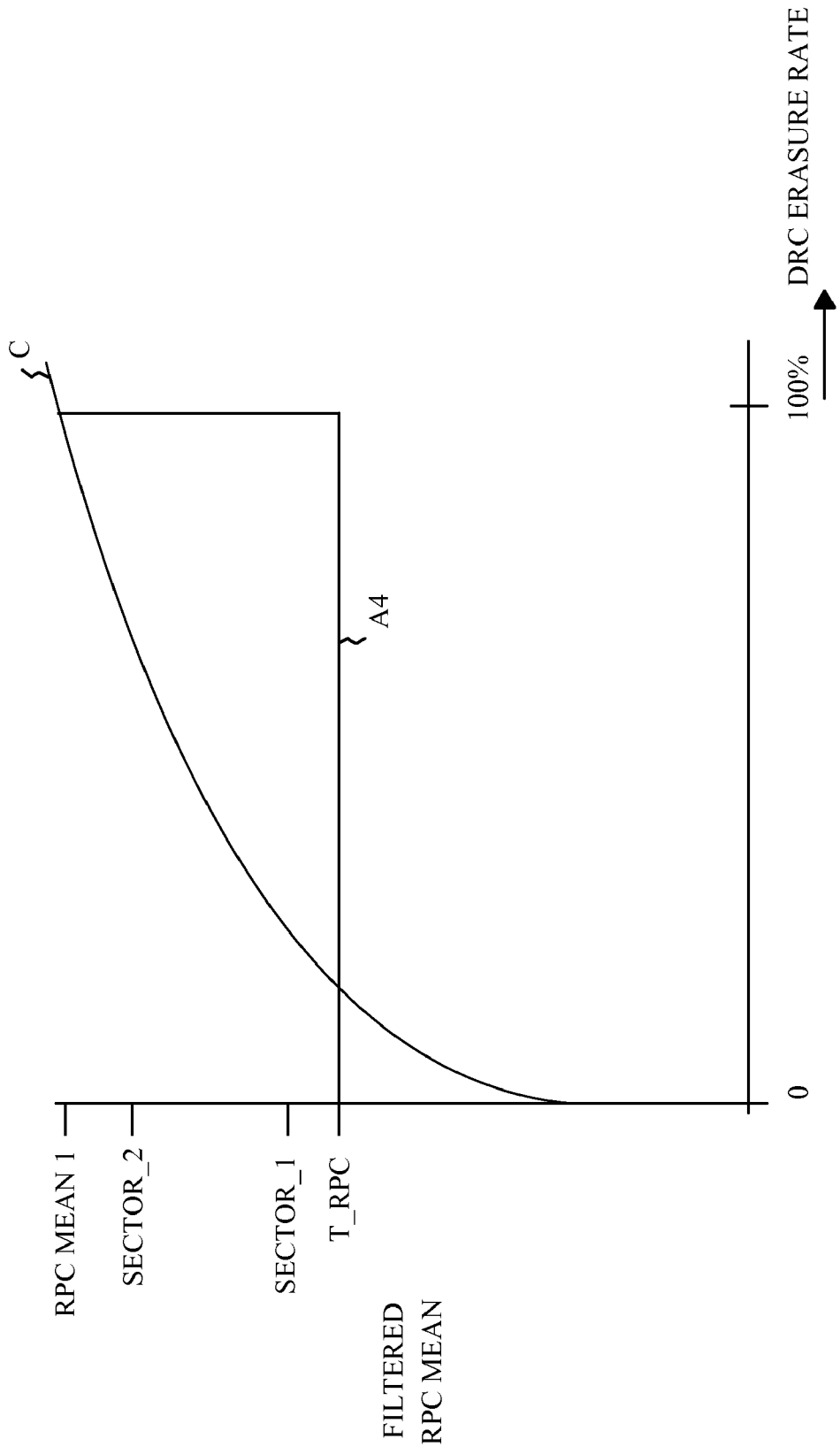
FIG. 4 illustrates an approximation of relationship between filtered RPC mean and a DRC erasure rate in accordance with one embodiment.

The processed (filtered) RPC estimate (mean) is used to estimate a DRC erasure rate. The relationship between the filtered RPC mean and the DRC erasure rate is very complex and depends on several variables, e.g., type of channel (Additive White Gaussian Noise (AWGN), Rayleigh, Rician), frequency selective fading, doppler rate, shadowing, and other variables known to one of ordinary skills in the art. Therefore, an engineering compromise between an actual relationship and an implementation approximation must be made. For example, curve C in FIG. 3 illustrates a typical relationship between a filtered RPC mean and a DRC erasure rate for a slow fading communication channel, as determined by a measurement. Curves A1, A2, and A3 illustrate embodiments of approximation that have been determined to be a good compromise between the actual relationship and implementation approximation. In accordance with another embodiment, illustrated in FIG. 4, the relationship between filtered RPC mean and a DRC erasure rate is approximated by a step function A4 with a step at an RPC threshold T_RPC. In accordance with one embodiment, the T_RPC is selected so that if the filtered RPC mean from a particular sector is greater than the T_RPC, the DRC erasure rate is at levels that prevent the AT from receiving satisfactory service on the forward link in terms of delays and throughput. One of ordinary skills in the art understands that satisfactory service is application dependent. Therefore, service resulting in outages may be intolerable, e.g. in real-time applications, although the outages may be tolerable in non-real time applications, e.g., ftp. In accordance with one embodiment, the default RPC threshold T_RPC equals to 0.95, as determined by simulation, laboratory testing, measurements, and other means known to one skilled in the art.

One of ordinary skill in the art understands that the choice of approximation curves affects the relative contribution of the forward and the reverse link quality metric to the resulting composite metric and, consequently, the performance of the communication system.

Server-state Based De-rating Method

As discussed, an AT uses the reverse link quality metric together with the forward link quality metric to make a re-pointing decision. In order to qualify a non-serving sector for re-pointing, the non-serving sector must accumulate sufficient credits. In accordance with one embodiment, the credits are accumulated by the non-serving sectors in accordance with the forward link filtered SINR mean, the filtered RPC mean of the serving sector, and the filtered RPC mean of the non-serving sectors. The credits are accumulated in a Credit Accumulation phase. To unambiguously award credits, the credits are initialized to a pre-determined value in an Initialization phase preceding the Credit Accumulation phase. The re-pointing decision in accordance with the accumulated credits is made in a Decision phase.

Initialization Phase

During the initialization phase, the AT selects a current serving sector. In accordance with one embodiment, the current serving sector is a sector with the best forward link quality metric, i.e., the highest SINR. The AT further initializes credits for all non-serving sectors to zero. In accordance with one embodiment, the credits are subsequently initialized to zero if a re-pointing from the current serving sector to a different sector occurred.

Figure 5:
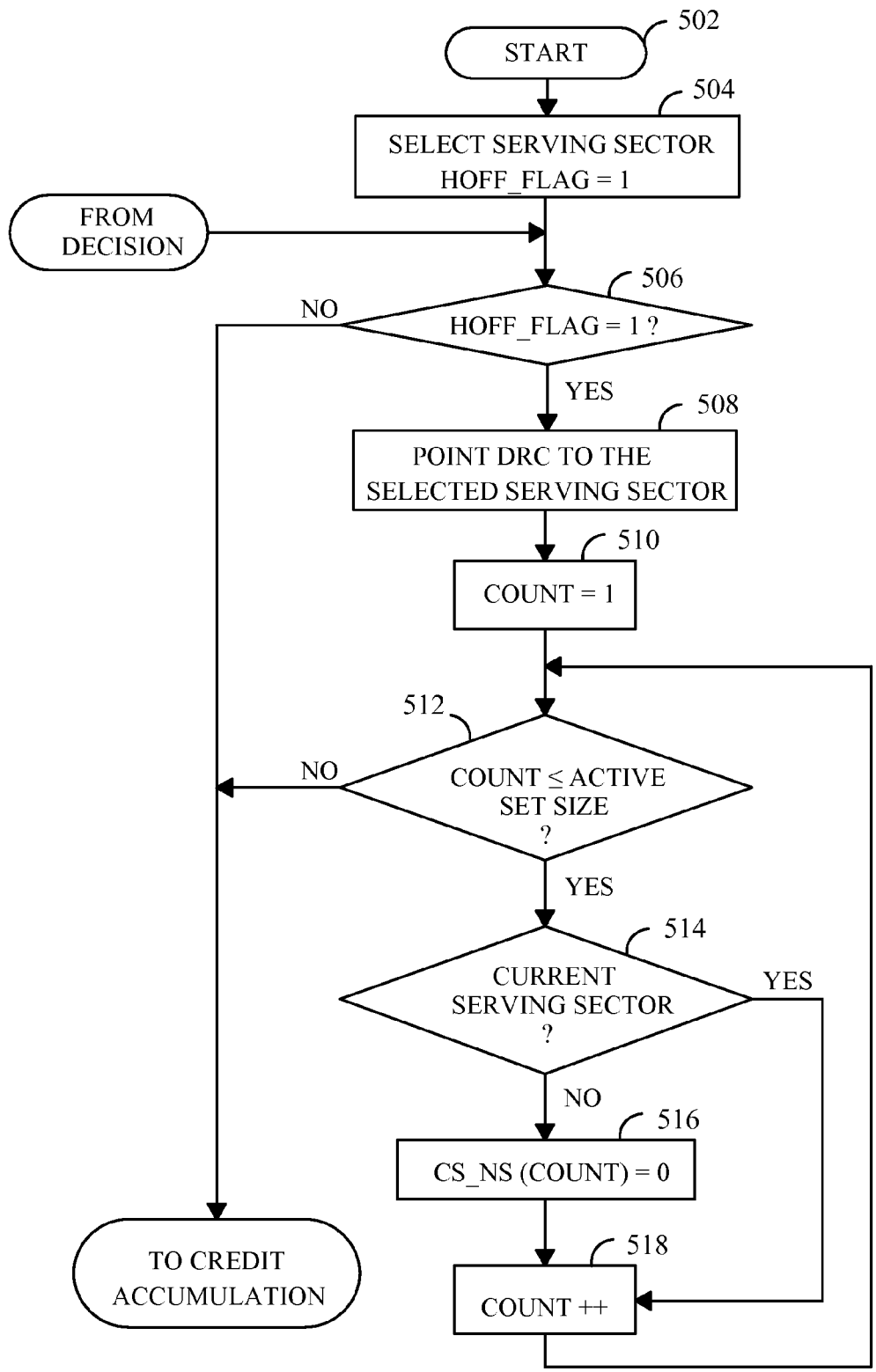
FIG. 5 illustrates a flowchart diagram of the Initialization phase in accordance with one embodiment.

FIG. 5 illustrates a flowchart diagram of the Initialization phase in accordance with one embodiment. The method starts in step 502 and continues in step 504.

In step 504, the AT selects a current serving sector. In accordance with one embodiment, the current serving sector is a sector with the best forward link quality metric, i.e., the highest SINR, as the serving sector. The AT also sets a variable Hoff_Flag to 1. This assures that the credits for all non-serving sectors are initially set to zero. The method continues in step 506.

In step 506, the variable Hoff_Flag is compared to 1. If the variable Hoff_Flag is equal to 1, the method continues with initialization in step 508, otherwise, the method continues in a Credit Accumulation Phase.

In step 508, the AT points the DRC to the selected sector. The method continues in step 510.

In step 510, a variable Count is set to 1. The method continues in step 512.

In step 512, the variable Count is tested against an active set size. If the variable Count is less than or equal to the active set size, the method continues in step 514, otherwise, the method continues in the Credit Accumulation Phase.

In step 514, the inquiry is made whether the sector identified by the variable Count is the current serving sector as re-pointed to in step 508. If the test is positive, the method continues in step 518, otherwise, the method continues in step 516.

In step 516, credits for the non-serving sectors (C_NS) identified by the variable Count are set to a value of 0. The method continues in step 518.

In step 518, the variable Count is incremented, and the method returns to step 512.

Credit Accumulation

In accordance with one embodiment, credits of a non-serving sector are incremented by a pre-determined amount (Credit_UP) if the filtered RPC mean of the non-serving sector (NS_RPC) is less than a pre-determined threshold (T_RPC) and the filtered RPC mean of the serving sector (SS_RPC) is greater than the T_RPC; or if the NS_RPC is less than the T_RPC and the SS_KPC is less than the T_RPC and the filtered SINR mean of a non-serving sector (FL_SINR NS) is greater than the filtered SINR mean of a serving sector (FL_SINR SS) modified by a pre-determined value (FL_SINR_Th).

The credits of a non-serving sector are decremented by a pre-determined amount (Credit_DN) if the FL_SINR_NS is less than FL_SINR_SS modified by a pre-determined value (FL_SINR_Th), or the NS_RPC is greater than the T_RPC.

Because a design criterion for a data communication system is to maximize throughput, a hysteresis FL_SINR_Th, is introduced into the credit accumulation process. The requirement that the de-rated forward link SINR of the non-serving sector is greater than a de-rated forward link SINR of the current serving sector modified by the value of the hysteresis to obtain credits assures that a re-pointing improves the forward link data rate. In accordance with one embodiment, the value of FL_SINR_Th is selected to allow a re-pointing to occur only if the re-pointing increases the forward link data rate to at least the next highest data rate.

Figure 6:
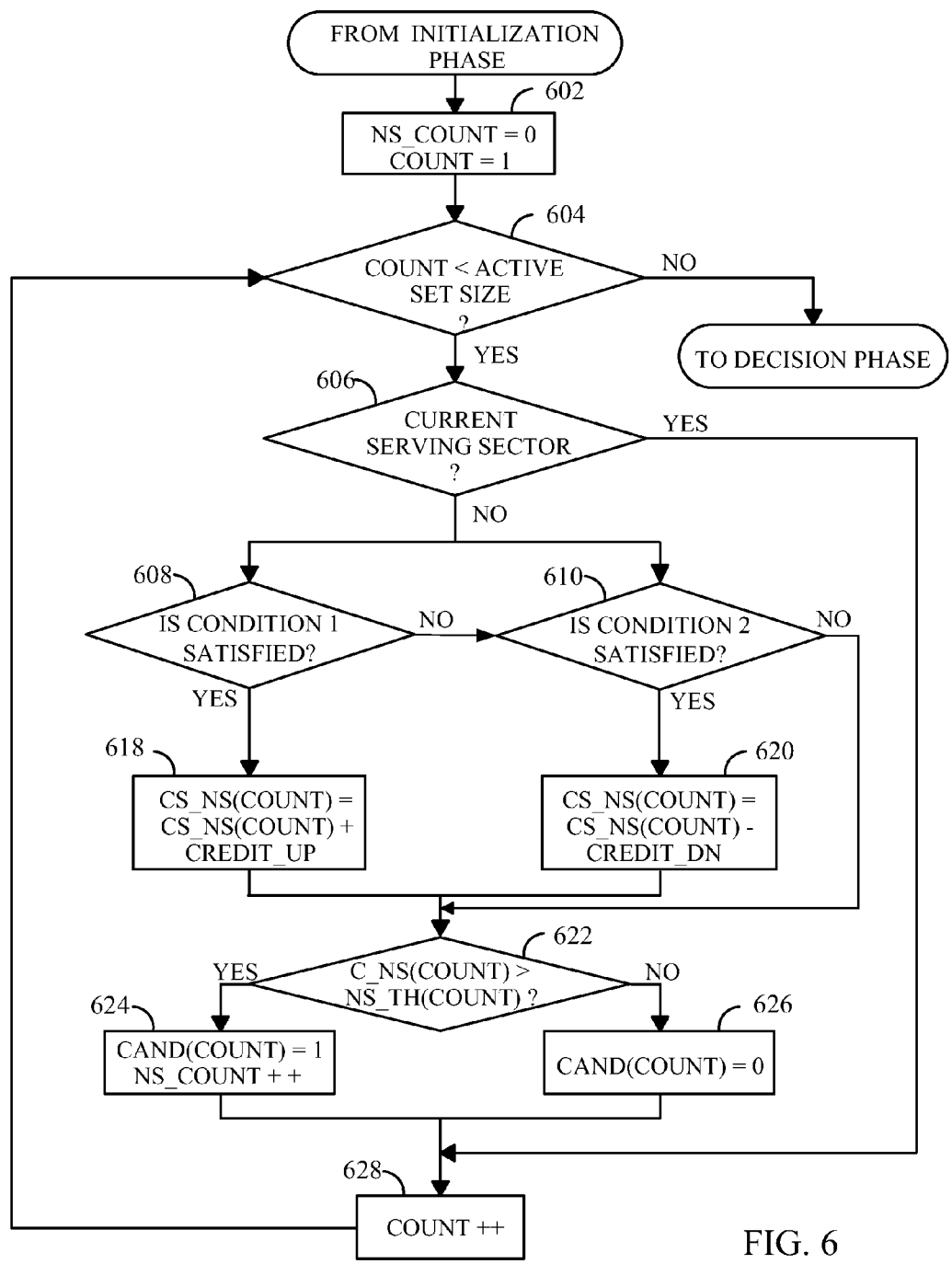
FIG. 6 illustrates a flowchart diagram of the Credit Accumulation phase in accordance with one embodiment.

FIG. 6 illustrates a flowchart diagram of the Credit Accumulation phase in accordance with one embodiment. The method starts in step 602, where a variable Count is set to 1 and a variable NS_Count is set to 0. The method continues in step 604.

In step 604, the variable Count is tested against the Active Set Size. If the variable count is less than the Active Set Size, the method continues in step 606 otherwise, the method continues in a Decision phase.

In step 606, an inquiry is made whether a sector designated by the variable count is the current serving sector. If the test is negative, the method continues in steps 608 and 610, otherwise, the method continues in step 628.

In step 608, an inquiry is made whether a first condition is satisfied. If the first condition is satisfied, the method continues in step 618. Otherwise, the method continues in step 610.

In one embodiment, the first condition tests whether the NS_RPC is less than T_RPC and the SS_RPC is greater than the T_RPC; or if the NS_RPC is less than the T_RPC and the SS_RPC is less than the T_RPC and the FL_SINR_NS is greater than the FL_SINR_SS modified by the FL_SINR_Th.

In step 610, an inquiry is made whether a second condition is satisfied. If the second condition is satisfied, the method continues in step 620. Otherwise, the method continues in step 622.

In one embodiment, the second condition tests whether the FL_SINRv_S is less than FL_SINR_SS modified by the FL_SINR_Th, or the NS_RPC is greater than the T_RPC.

Those of ordinary skill in the art will appreciate that the first condition and the second condition may be based on other comparisons between a sector's de-rated forward link quality metric and a de-rated forward link quality metric of the currently serving sector.

In step 618, a value of the variable C_NS identified by the variable count is incremented by a value of Credit_UP. The method continues in step 622.

In step 620, a value of the variable C_NS identified by the variable count is decremented by a value of Credit_DN. The method continues in step 622.

In step 622, a value of the variable C_NS identified by the variable Count is compared against a pre-determined threshold NS_Th identified by the variable Count. If the value of the variable C_NS identified by the variable Count is greater than the NS_Th identified by the variable Count, the method continues in step 624; otherwise, the method continues in step 626.

In step 624, a value of the variable Cand identified by the variable Count is set to 1 and the value of the variable NS_COUNT is incremented by 1. The method continues in step 628.

In step 626, a value of the variable Cand identified by the variable Count is set to 0. The method continues in step 628.

In step 628, the variable count is incremented, and the method returns to step 504.

Decision Phase

In the decision phase, the AT makes a re-pointing decision. As discussed, a design criterion for a data communication system is to maximize throughput; consequently, the AT decides to re-point only if the candidate sector maximizes the forward link throughput. In accordance with one embodiment, the decision to re-point to a non-serving sector is made if the non-serving sector provides higher FL_SINR and better quality reverse link, as determined by the non-serving sector's credits. To carry out the decision, the AT first ascertains those non-serving sectors that have credits greater than or equal to a pre-determined threshold (NS_Th). In accordance with one embodiment, the pre-determined threshold is equal to the Soft/Softer handoff delay. If at least one of the non-serving sectors satisfies this condition, the AT re-points the DRC to the sector with the highest credits. In accordance with one embodiment, if two or more non-serving sectors have equal credits, a sector with the highest quality reverse link is selected. The quality of the reverse link is determined in accordance with the reverse link's filtered RPC mean. In another embodiment, if two or more non-serving sectors have equal credits, a sector with the highest quality forward link is selected.

If none of the non-serving sectors has credits greater than or equal to the NS_Th, the AT continues pointing its DRC to the current serving sector.

Figure 7:
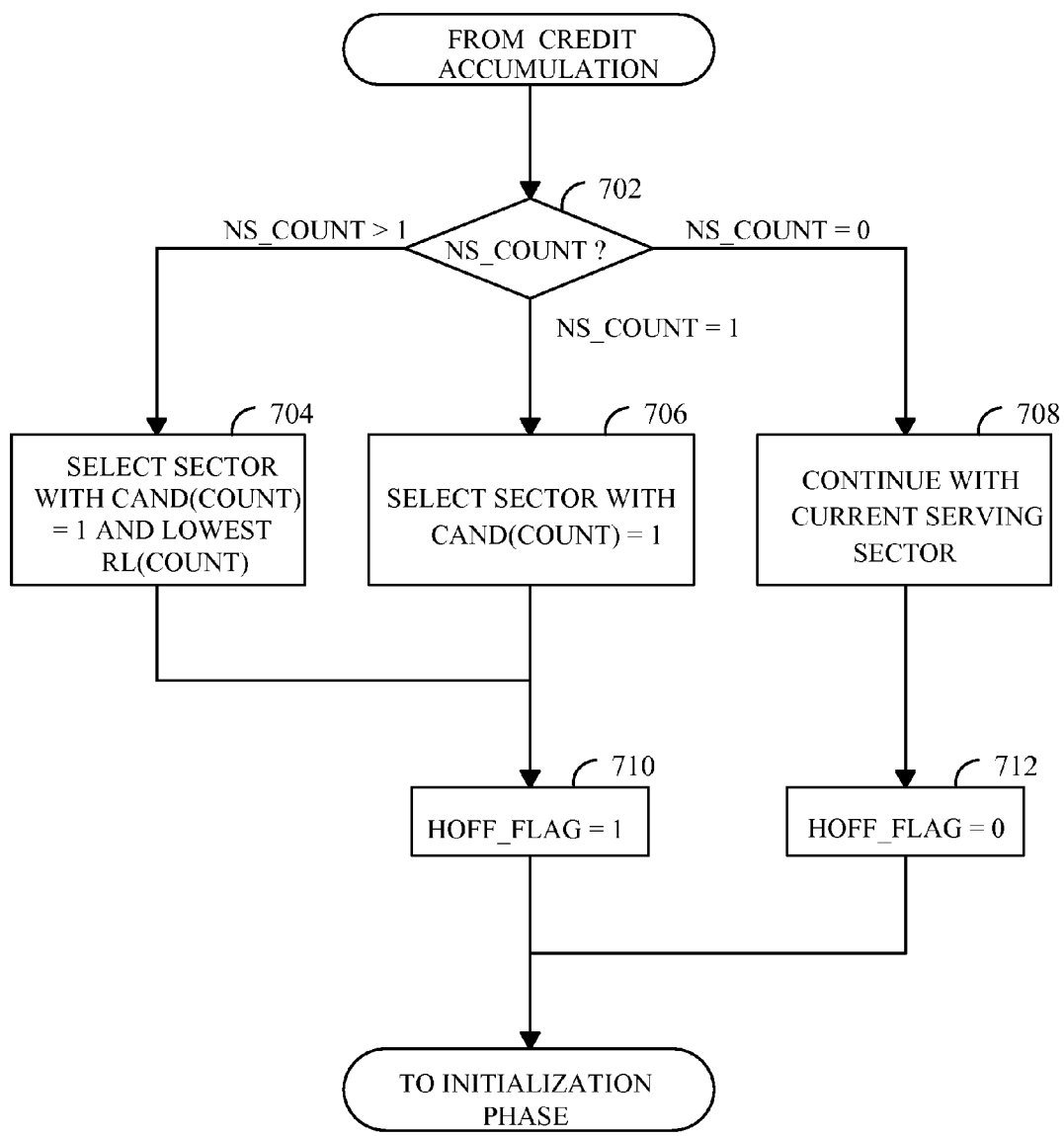
FIG. 7 illustrates a flow diagram of the Decision phase in accordance with one embodiment.

FIG. 7 illustrates a flow diagram of the decision phase in accordance with one embodiment. In step 702, the value of the variable NS_Count is ascertained. If the value of the variable NS_Count is greater than 1, the method continues in step 704. If the value of the variable NS_Count is equal to 1, the method continues in step 706; otherwise, the method continues in step 708.

In step 704, the AT re-points the DRC to the candidate sector identified by the variable count that has the highest quality reverse link in accordance with the sector's reverse link's filtered RPC mean. Alternatively, the AT re-points the DRC to the candidate sector identified by the variable count that has the highest quality forward link (not shown). The method continues in step 710.

In step 706, the AT re-points the DRC to the candidate sector identified by the variable Cand(Count)=1. The method continues in step 710.

In step 708, the AT continues with the current serving sector. The method continues in step 712.

In step 710, the variable Hoff_Flag is set to 1. The method returns to the Initialization phase.

In step 712, the variable Hoff_Flag is set to 0. The method returns to the Initialization phase.

De-Rating Based Adaptive Server Selection

In accordance with another embodiment, the relationship between the filtered RPC mean and the DRC erasure rate is used to scale (de-rate) the forward link SINR to reflect the condition of the reverse link. The de-rated forward link SINR is then used to accumulate credits for a particular sector. To unambiguously award credits, the credits are initialized to a pre-determined value in an Initialization phase. The credits are accumulated in accordance with the forward link quality metric and the reverse quality metric in. a Credit Accumulation phase. The re-pointing decision in accordance with the accumulated credits is made in a Decision phase.

Figure 8:
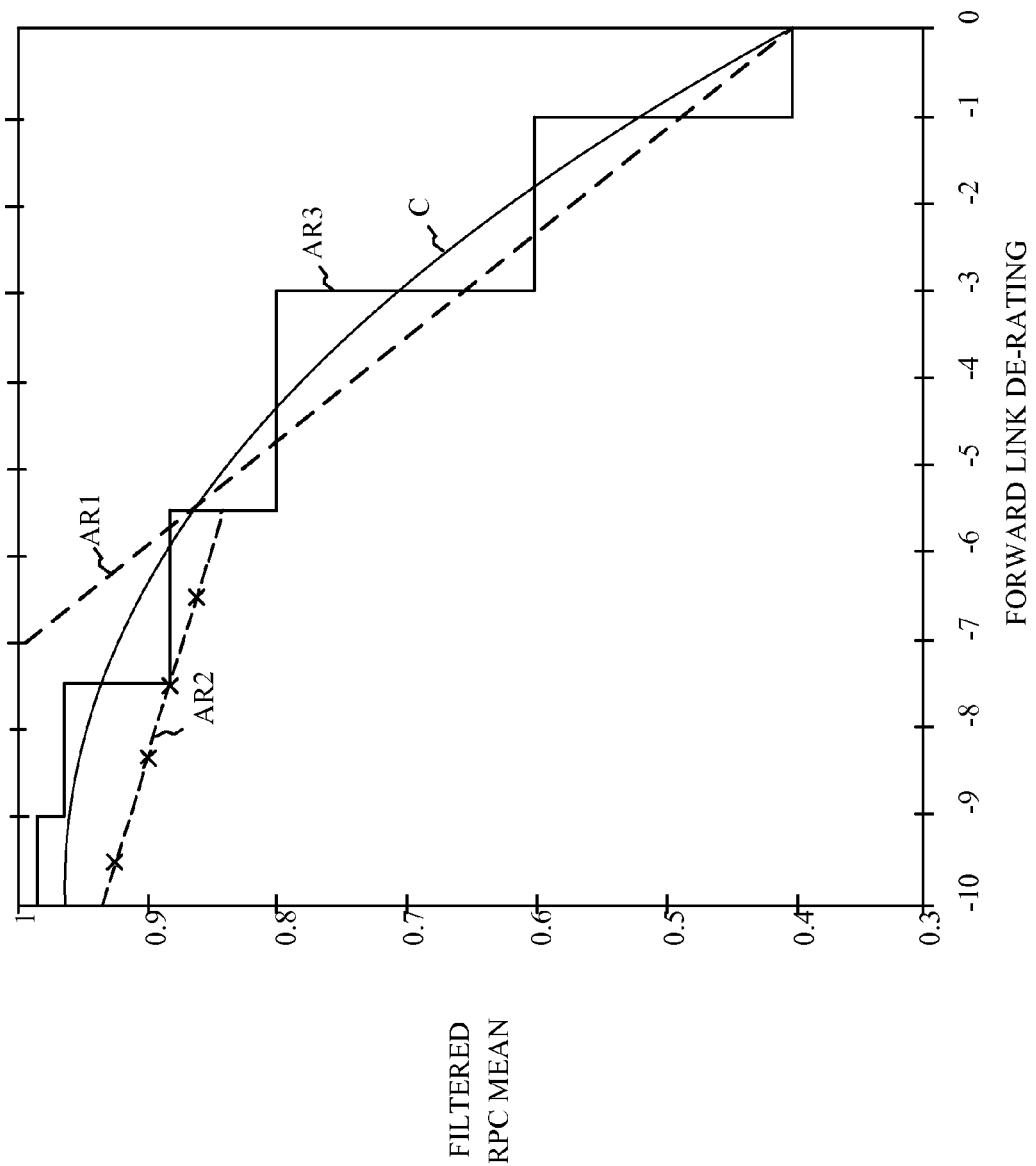
FIG. 8 illustrates a relationship between a filtered RPC mean and a forward link SINR de-rating for a slow fading communication channel.

One of ordinary skill in the art recognizes that it is not necessary to first determine the DRC erasure rate from a filtered RPC mean, and then use a relationship between a DRC erasure rate and a de-rating for the forward link SINR to determine the forward link SINR de-rating. Instead, the relationship between the filtered RPC mean and the DRC erasure rate and the relationship between a DRC erasure rate and a de-rating for the forward link SINR can be used to provide a relationship between the filtered RPC mean and the de-rating for the forward link SINR. Consequently, curve C in FIG. 8 illustrates a relationship between a filtered RPC mean and a forward link SINR de-rating for a slow fading communication channel, as determined by measurement, simulation and other engineering methods. Curves AR1, AR2, and AR3, illustrate embodiments of approximation that have been determined to be a good compromise between the actual relationship and implementation approximation. In another embodiment, illustrated in FIG. 9, the relationship between the filtered RPC mean and the forward link SINR de-rating is approximated by a step function with a step at T_RPC.

Figure 9:
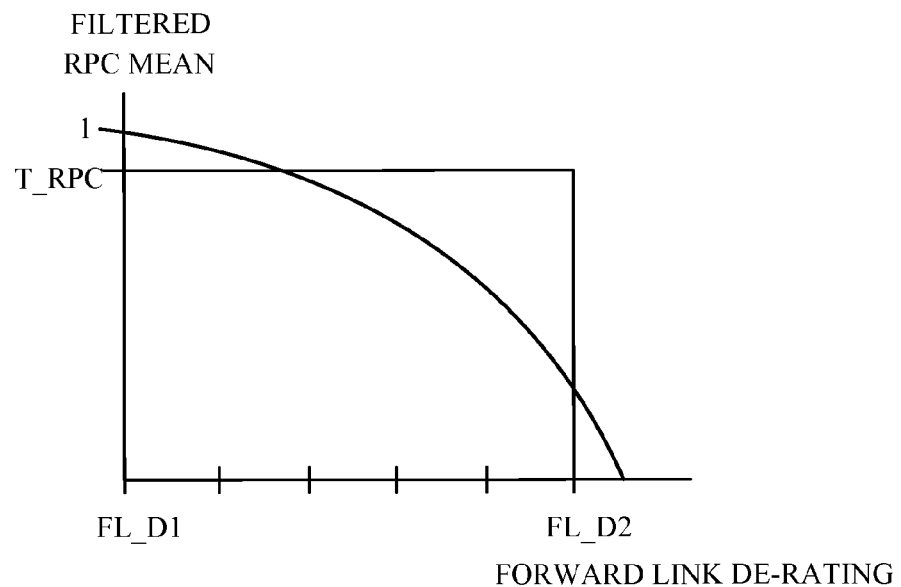
FIG. 9 illustrates approximations of a relationship between filtered RPC mean and a forward link de-rating.

One of ordinary skill in the art understands that the choice of approximation curves affects the relative contribution of the forward and the reverse link quality metric and, consequently, the performance of the communication system. For example, as illustrated in FIG. 9, the approximation depends on choice of the T_RPC, the amount of de-rating below the T_RPC (FL_D1), and the amount of de-rating above the T_RPC (FL_D2).

Initialization

During the initialization phase, the AT selects a current serving sector. In accordance with one embodiment, the current serving sector is a sector with the best forward link quality metric, i.e., the highest SINR. The AT further initializes credits for all non-serving sectors to zero. In accordance with one embodiment, the credits are subsequently initialized to zero if a re-pointing from the current serving sector to a different sector occurred. Because the initialization phase in accordance with this embodiment has identical objectives as the initialization phase of the above-described embodiment, the initialization phase in accordance with this embodiment is carried out according to FIG. 5 and accompanying text.

Credit Accumulation Phase

As discussed, in accordance with this embodiment, the relationship between the filtered RPC mean and the DRC erasure rate is used to scale (de-rate) the forward link SINR to reflect the condition of the reverse link. The de-rated forward link SINR is then used to accumulate credits for a particular sector.

The credits are accumulated by the non-serving sectors in accordance with the de-rated forward link filtered SINR mean. In accordance with one embodiment, the credits of a non-serving sector (C_NS) are incremented by a pre-determined amount (Credit_UP) if a de-rated forward link SINR of the non-serving sector (FL_D_NS) is greater than a de-rated forward link SINR of the current serving sector (FL_D_SS) modified by a pre-determined value (FL_SINR_Th). The credits of a non-serving sector are decremented by a pre-determined amount (Credit_DN) if the above condition is not satisfied.

Because a design criterion for a data communication system is to maximize throughput, a hysteresis FL_SINR_Th, is introduced into the credit accumulation process. The requirement that the de-rated forward link SINR of the non-serving sector is greater than a de-rated forward link SINR of the current serving sector modified by the value of the hysteresis to obtain credits assures that a re-pointing improves the forward link data rate. In accordance with one embodiment, the value of FL_SINR_Th is selected to allow a re-pointing to occur only if the re-pointing increases the forward link data rate to at least the next highest data rate.

Figure 10:
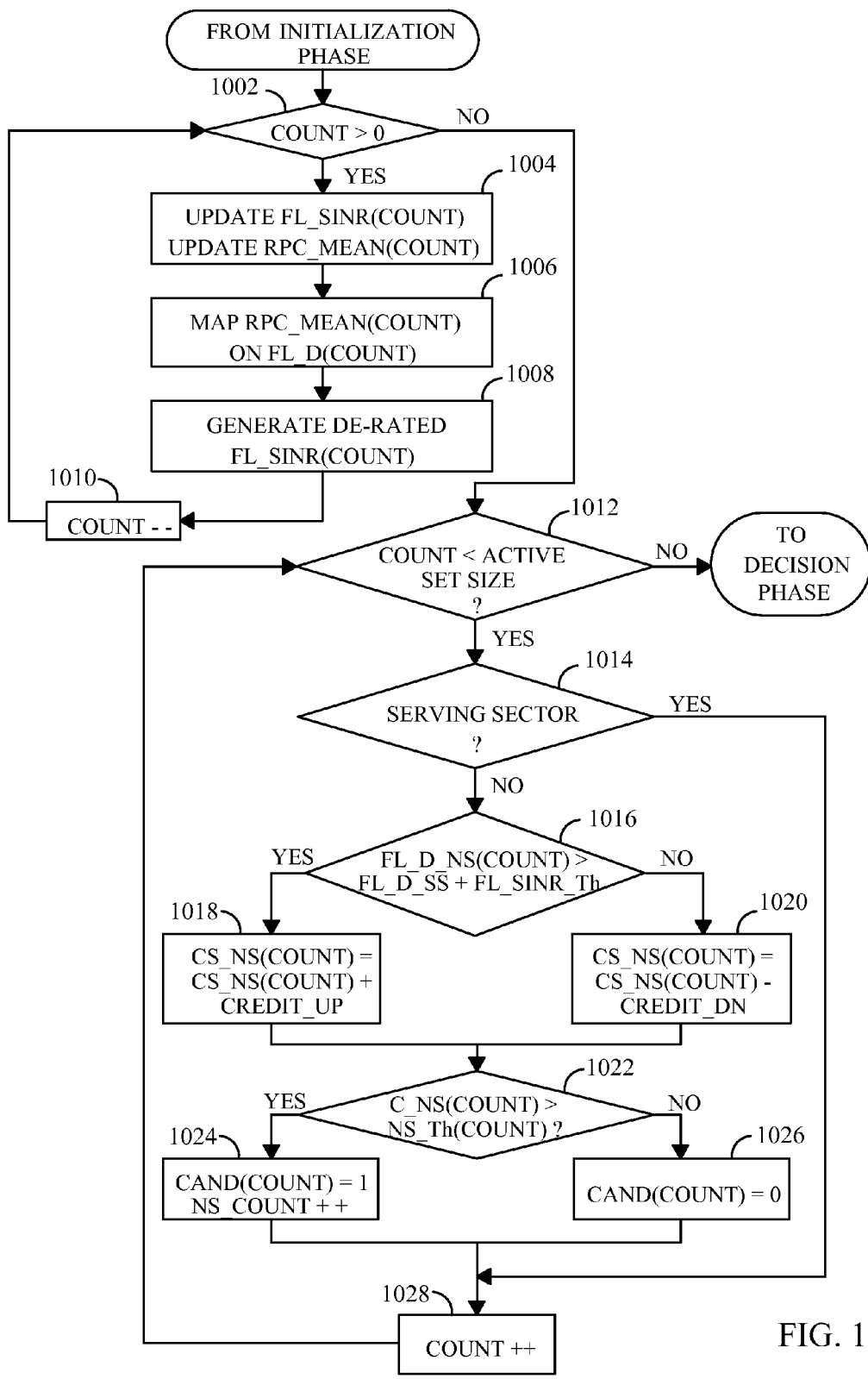
FIG. 10 illustrates a flowchart diagram of the Credit Accumulation phase in accordance with one embodiment.

FIG. 10 illustrates a flowchart diagram of the Credit Accumulation phase in accordance with one embodiment. The method starts in step 1002 where, the variable Count is compared to 0. If the variable Count is greater than 0, the method continues in step 1004, otherwise, the method continues in step 1012.

In step 1004, values of a filtered FL_SINR mean and a filtered RPC mean (RPC_mean) identified by the variable Count are updated. The method continues in step 1006.

In step 1006, the updated value of the filtered RPC mean identified by the variable Count is mapped on a corresponding value of a de-rating value of a forward link SINR (FL_D) identified by the variable Count. The method continues in step 1008.

In step 1008, a de-rated filtered FL_SINR mean (FL_SINR_D) is generated by de-rating the updated filtered FL_SINR mean identified by the variable Count by the de-rating value FL_D identified by the variable Count. The method continues in step 1010.

In step 1010, the variable Count is decremented, and the method returns to step 1002.

In step 1012, the variable Count is tested against the Active Set Size. If the variable Count is less than the Active Set Size, the method continues in step 1014 otherwise, the method continues in a Decision phase.

In step 1014, an inquiry is made whether a sector designated by the variable Count is the current serving sector. If the test is positive, the method continues in step 1030, otherwise, the method continues in step 1016.

In step 1016, a value of the de-rated forward link SINR mean of the non-serving sector (FL_D NS) identified by the variable Count is compared against the de-rated forward link SINR mean for current serving sector (FL_D_SS) modified by the value of FL_SINR_Th. If the FL_D_NS identified by the variable Count is greater than the FL_D_SS modified by the value of FL_SINR_Th, the method continues in step 1018, otherwise, the method continues in step 1020.

In step 1018, a value of the variable C_NS identified by the variable Count is incremented by a value of Credit_UP. The method continues in step 1022.

In step 1020, a value of the variable C_NS identified by the variable Count is decremented by a value of Credit_DN. The method continues in step 1022.

In step 1022, a value of the variable C_NS identified by the variable Count is compared against an NS_Th identified by the variable Count. If the value of the variable C_NS identified by the variable Count is greater than the NS_Th identified by the variable Count, the method continues in step 1024; otherwise, the method continues in step 1026.

In step 1024, a value of the variable Cand identified by the variable Count is set to 1 and the value of the variable NS_COUNT is incremented by 1. The method continues in step 1028.

In step 1026, a value of the variable Cand identified by the variable Count is set to 0. The method continues in step 1028.

In step 1028, the variable count is incremented, and the method returns to step 1012.

Decision Phase

In the decision phase, the AT makes a re-pointing decision. As discussed, a design criterion for a data communication system is to maximize throughput; consequently, the AT decides to re-point only if the candidate sector maximizes the forward link throughput. In accordance with one embodiment, the decision to re-point to a non-serving sector is made if the non-serving sector provides higher FL_SINR and better quality reverse link, as determined by the non-serving sector's credits. To carry out the decision, the AT first ascertains those non-serving sectors that have credits greater than or equal to a pre-determined threshold (NS_Th); which is the soft/softer handoff delay. In accordance with one embodiment, the pre-determined threshold is equal to a fraction of the Soft/Softer handoff delay. If at least one of the non-serving sectors satisfies this condition, the AT re-points the DRC to the sector with the highest credits. In accordance with one embodiment, if two or more non-serving sectors have equal credits, a sector with the highest quality reverse link is selected. The quality of the reverse link is determined in accordance with the reverse link's filtered RPC mean. In another embodiment, if two or more non-serving sectors have equal credits, a sector with the highest quality forward link is selected.

If none of the non-serving sectors has credits greater than or equal to a pre-determined threshold (NS_Th), the AT continues pointing its DRC to the current serving sector.

To prevent re-pointing from occurring too rapidly, a minimum time interval must elapse from the last re-pointing. The minimum time interval is determined in accordance with a communication system implementation. In accordance with one embodiment, the minimum time interval has a value equal to the soft/softer handoff delay. However, to prevent loss of communication in case of sudden change in the communication link condition, if the filtered RPC mean associated with a current serving sector (SS_RPC) exceeds the RPC threshold (T_RPC) and at least one non-serving sector has accumulated credits greater than a pre-determined threshold (Hoff_Th), a re-pointing earlier than the minimum time interval is allowed. Because the Hoff_Th determines whether a re-pointing will be allowed when the communication with the serving sector deteriorated, the choice of the Hoff_Th is deployment dependent. In one embodiment, the Hoff_Th is set to zero. The AT re-points the DRC to the sector with the highest credits greater than the Hoff_Th. In accordance with one embodiment, if two or more non-serving sectors have equal credits, a sector with the highest quality reverse link is selected. The quality of the reverse link is determined in accordance with the reverse link's filtered RPC mean. In another embodiment, if two or more non-serving sectors have equal credits, a sector with the highest quality forward link is selected.

Figure 11:
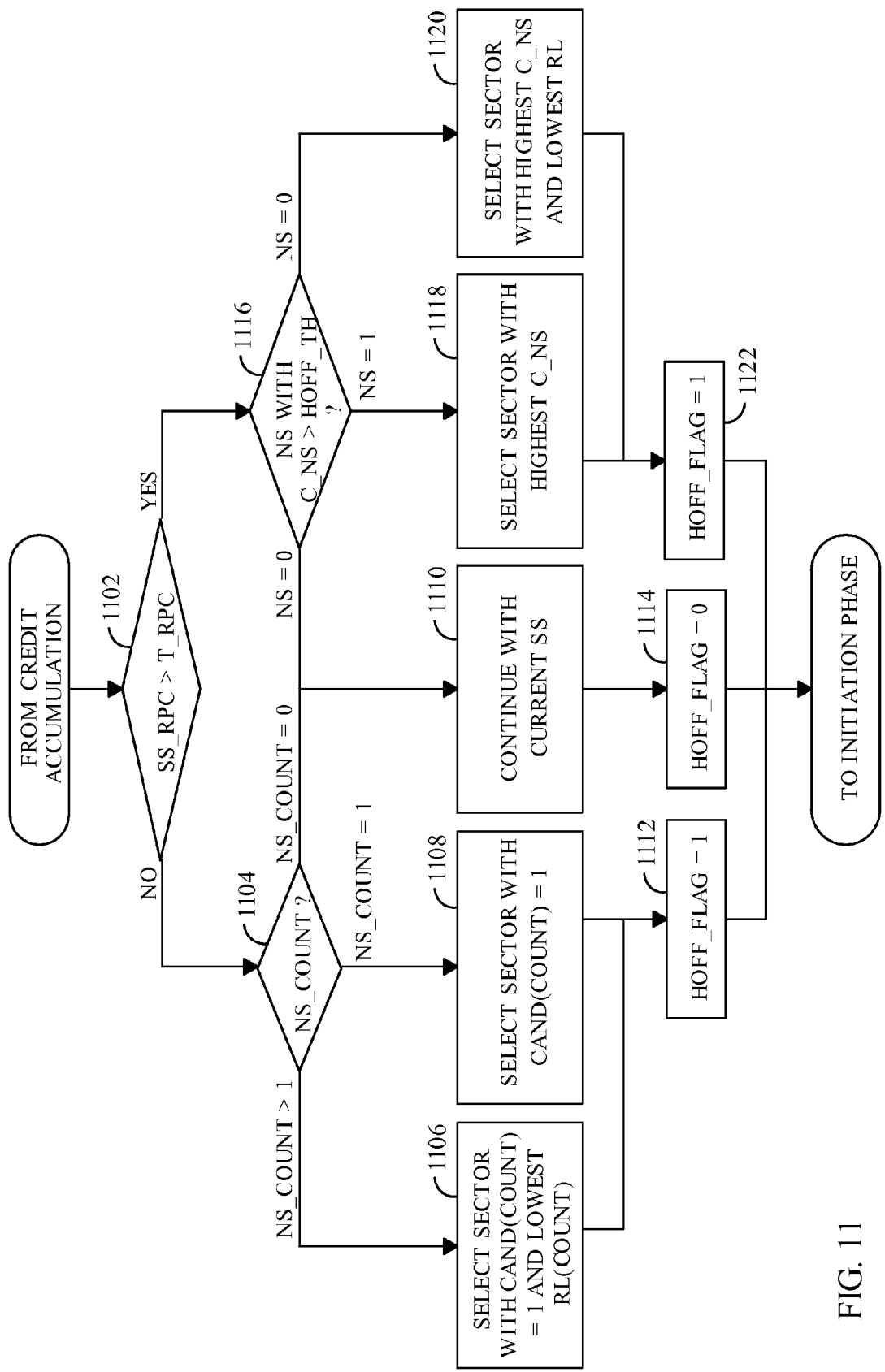
FIG. 11 illustrates a flow diagram of the Decision phase in accordance with another embodiment.

FIG. 11 illustrates a flow diagram of the decision phase in accordance with above described embodiments.

In step 1102, the value of the variable SS_RPC is compared against the T_RPC. If the value of the variable SS_RPC is less than the value of the T_RPC, the method continues in step 1104; otherwise, the method continues in step 1106.

In step 1104, the value of the variable NS_Count is ascertained. If the value of the variable NS_Count is greater than 1, the method continues in step 1106. If the value of the variable NS_Count is equal to 1, the method continues in step 1108; otherwise, the method continues in step 1110.

In step 1106, the AT re-points the DRC to the candidate sector identified by the variable count that has the highest quality reverse link in accordance with the sector's reverse link's filtered RPC mean. Alternatively, the AT re-points the DRC to the candidate sector identified by the variable count that has the highest quality forward link (not shown). The method continues in step 1112.

In step 1108, the AT re-points the DRC to the candidate sector identified by the variable Cand(Count)=1. The method continues in step 1112.

In step 1110, the AT continues with the current serving sector. The method continues in step 1114.

In step 1112, the variable Hoff_Flag is set to 1. The method returns to the Initialization phase.

In step 1114, the variable Hoff_Flag is set to 0. The method returns to the Initialization phase.

In step 1116, the test is made if any of the non-serving sectors has credits exceeding the Hoff_Th. If no non-serving sector has credits exceeding the Hoff_Th, the method continues in step 1110. If one non-serving sector has credits exceeding the Hoff_Th, the method continues in step 1118; otherwise, the method continues in step 1120.

In step 1118, the AT re-points the DRC to the candidate sector. The method continues in step 1122.

In step 1120, the AT re-points the DRC to the candidate sector with the highest quality reverse link in accordance with the sector's reverse link's filtered RPC mean. Alternatively, the AT re-points the DRC to the candidate sector that has the highest quality forward link (not shown). The method continues in step 1112.

In step 1122, the variable Hoff_Flag is set to 1. The method returns to the Initialization phase.

Re-Pointing with Reverse Link Hysteresis

Figure 13:
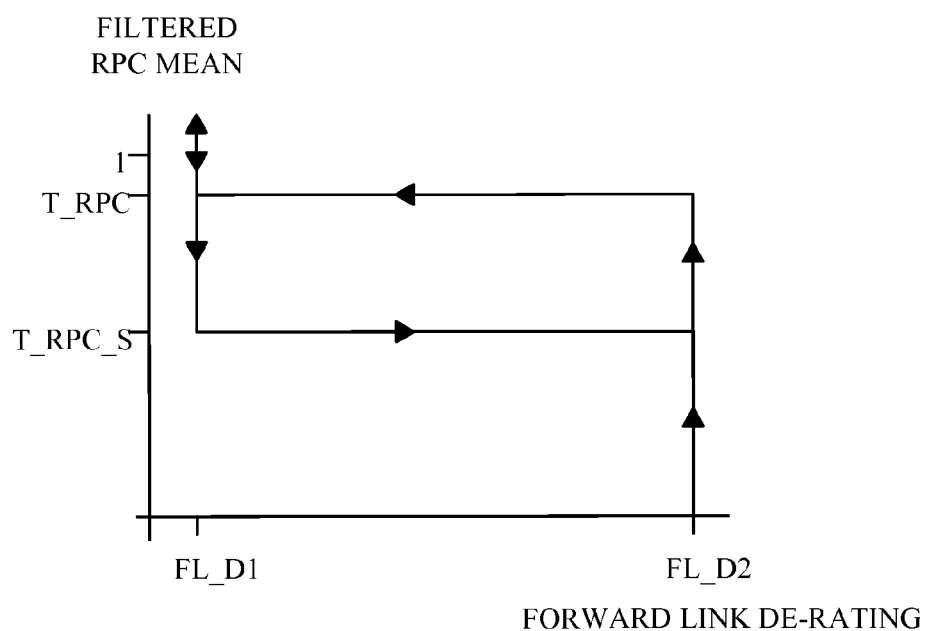
FIG. 13 illustrates an approximation of a relationship between filtered RPC mean and a forward link de-rating in accordance with one embodiment.
Figure 12:
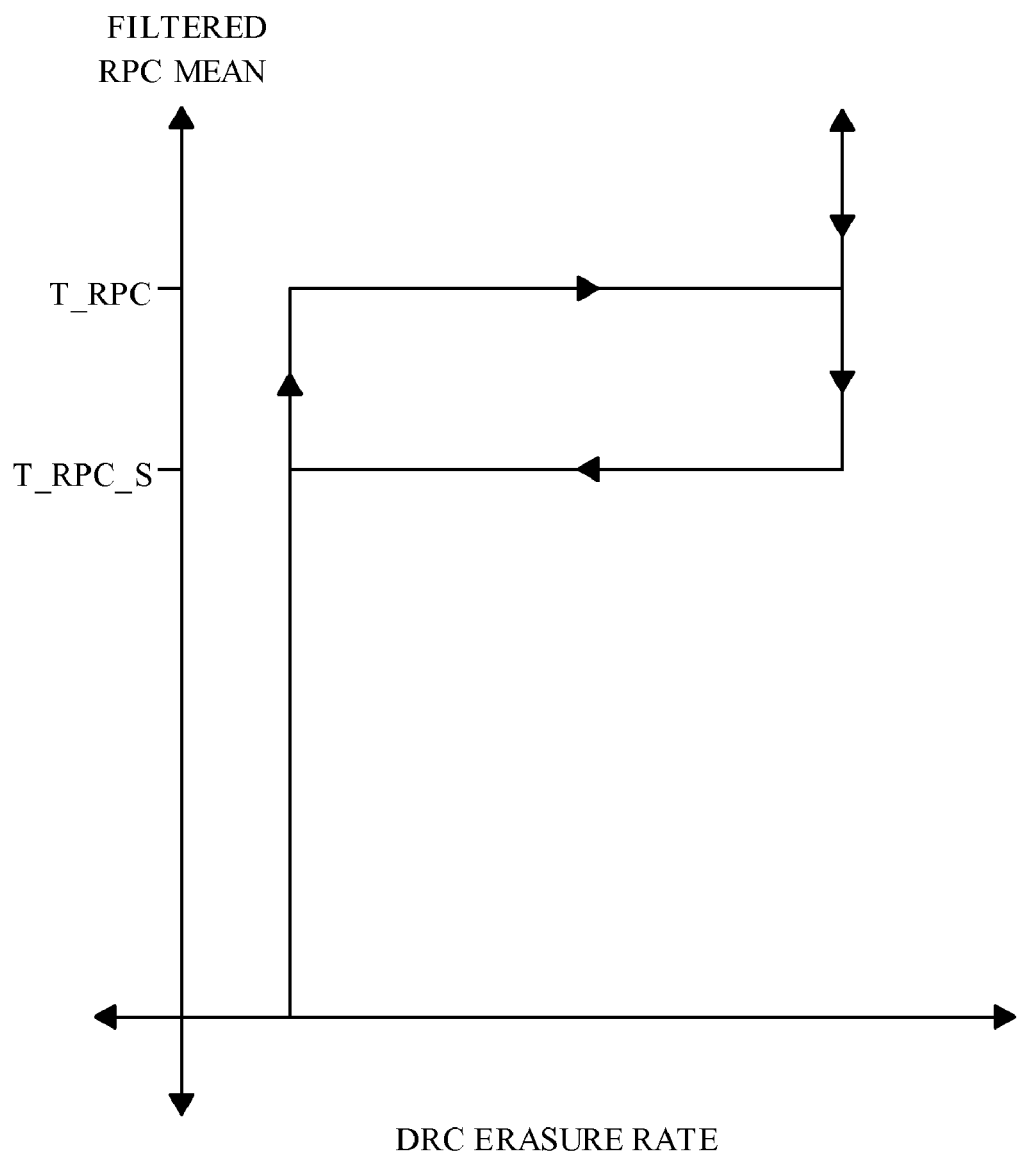
FIG. 12 illustrates an approximation of a relationship between filtered RPC mean and a DRC erasure rate in accordance with one embodiment

In accordance with the re-pointing method as described, an AT selects a different sector when a non-serving sector in the AT's active set accumulates sufficient credits. Because the credit accumulation is affected by a filtered RPC mean, when a step function approximation of the relationship between the filtered RPC mean and a DRC erasure rate is used, rapid filtered RPC mean fluctuation around the RPC threshold changes a level of forward link SINR de-rating. Because the filtered RPC mean is re-evaluated each slot, the AT may potentially re-point faster than the minimum time interval between re-pointings (as indicated by soft/softer handoff delay), causing outages and service interruption. Therefore, in order to minimize the outages and the service interruptions, a hysteresis is introduced into the decision process by means of a second RPC threshold as illustrated in FIGS. 12 and 13. The second RPC threshold T_RPC_S is determined by simulation, measurement, or other means known to one skilled in the art. FIG. 12 illustrates a relationship between filtered RPC mean and a DRC erasure rate in accordance with one embodiment of the method where the T_RPC equals 0.95, and the T_RPC_S threshold equal to 0.90.

FIG. 13 illustrates a relationship between filtered RPC mean and a forward link de-rating in accordance with this embodiment. If the reverse link filtered RPC mean associated with a particular sector is greater than the T_RPC, the forward link filtered SINR mean associated with the given sector is decreased (de-rated) by a first pre-determined factor (FL_D1). The forward link filtered SINR stays de-rated, until the filtered RPC mean of the particular sector decreases below the second T_RPC_S. Conversely, if the reverse link filtered RPC mean associated with a particular sector is less than the T_RPC_S, the forward link filtered SINR mean associated with the given sector is de-rated by a second pre-determined factor (FL_D2) until the reverse link filtered RPC mean associated with the particular sector is greater than the T_RPC_S.

Referring back to FIG. 10 the above-described hysteresis method affects the mapping of step 1006.

Although the reverse link hysteresis was described with respect to the step function approximation of the relationship between the filtered RPC mean and a DRC erasure rate, one of ordinary skills in the art recognizes that such a measure can be taken for other approximations.

Re-pointing Using DRC Lock Bit and Multi-level Derating

Figure 14:
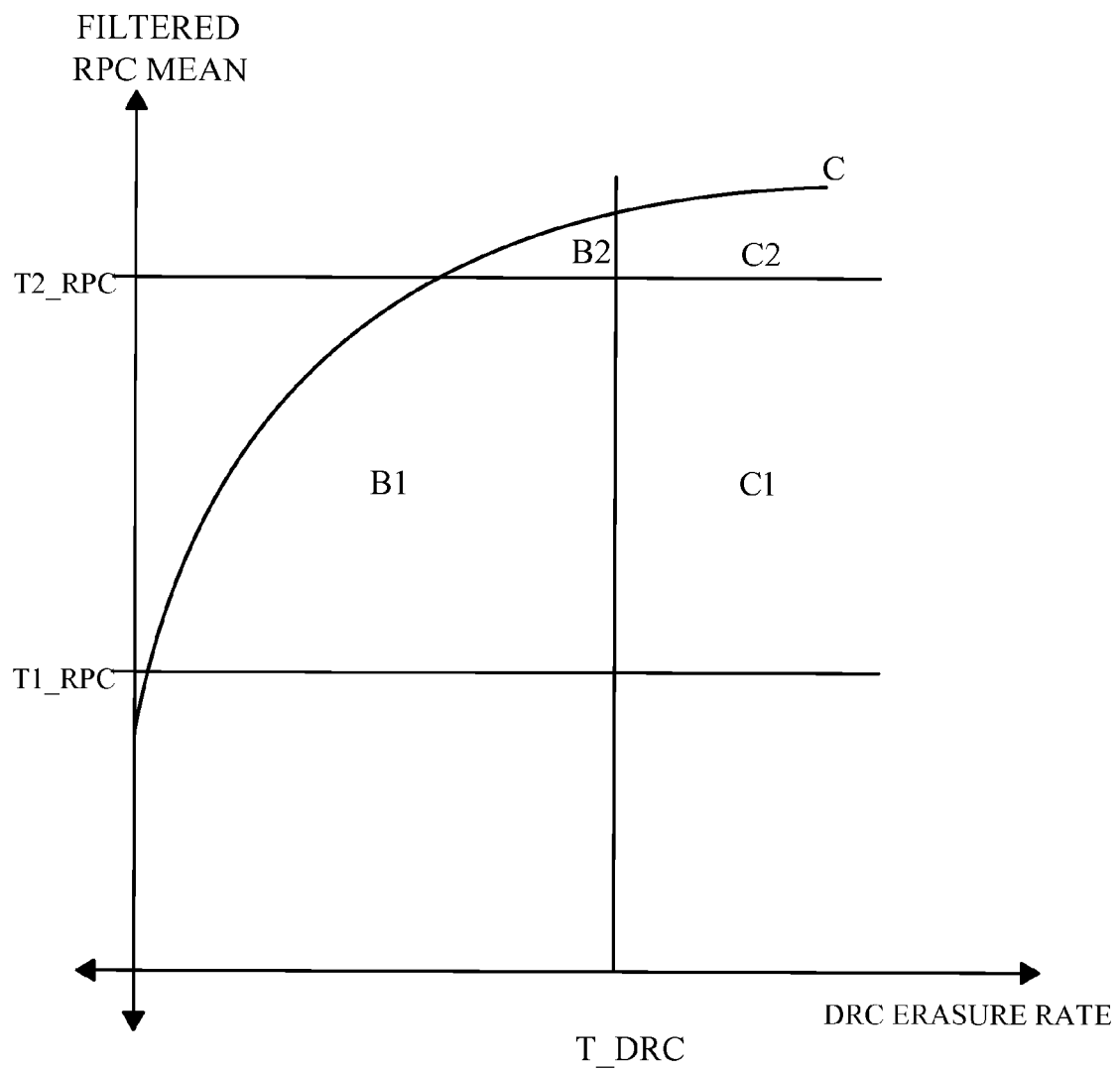
FIG. 14 illustrates a relation between a filtered RPC mean and a DRC erasure rate for a slow-fading communication channel with identification of re-pointing regions.

As discussed, in accordance with one embodiment of the communication system of FIG. 1, data transmission on the forward link occurs from one sector to one AT during a time-slot at or near the maximum data rate that can be supported by the forward link and the communication system. At each time time-slot, the sector can schedule data transmission to any of the ATs that received the paging message. The sector uses the rate control information received from each AT in the DRC message to efficiently transmit forward link data at the highest possible rate. Consequently, the scheduling algorithm serves the AT from which the sector received a valid DRC if the DRC from a particular AT has been erased. The scheduling thus prevents degradation in forward link sector throughput as long as the DRC erasure rate from ATs served by the sector is below a threshold (T_DRC). In one embodiment the threshold has been determined based on simulations, lab tests, field trials and other means known to one skilled in the art to be 0.4. This knowledge is not exploited in the re-pointing method based on RPC, which can lead to a sub-optimal communication system performance as explained with reference to FIG. 14, which illustrates a relation between a filtered RPC mean and a DRC erasure rate for a slow-fading communication channel (curve marked "C"). Referring to FIG. 14:

In a region marked B2, the filtered RPC mean is greater than T2_RPC, consequently, under the re-pointing method based on RPC, a re-pointing is triggered, although the DRC Erasure Rate (less than a threshold T_DRC) is acceptable.

In a region marked C1, the filtered RPC mean is less than T2_RPC, consequently, under the re-pointing method based on RPC, a re-pointing is not triggered, although the DRC Erasure Rate (greater than the threshold T_DRC) degrades the forward link throughput.

The above-mentioned issues pertaining to the regions B2 and C1 can be addressed by various methods. In accordance with one embodiment, a re-pointing method utilizing a DRC lock indicator described in the above-mentioned U.S. Pat. No. 6,757,520 does not use the filtered RPC means to determine when the AT is to re-point; consequently, the issues pertaining to the regions B2 and C2 are eliminated. However, the AT may potentially re-point to a sector, which is also in region C1. Therefore, in accordance with one embodiment, a re-pointing method utilizing a DRC lock indicator in combination with a filtered RPC is used.

As discussed, the AT can directly determine neither the reverse link SINR nor the DRC erasure rate. Both the reverse link SINR and the DRC erasure rate may be directly determined by the sectors in the AT active set. The sector(s) then supplies the AT with the determined values of the reverse link SINR or the DRC erasure rate via a feedback loop. In order for a sector to transmit accurate information regarding the reverse link SINR or DRC erasure rate, the sector must use some forward link capacity. In order to minimize the impact on forward link capacity the reverse link SINR or the DRC erasure rate is sent with very low granularity. In accordance with one embodiment, the granularity is one bit. Furthermore, a consideration of a feedback loop speed versus a performance of the Reverse Link Traffic Channel performance must be made.

Therefore, in a Message Based DRC Lock embodiment, each sector in the AT active set monitors the DRC channel and evaluates an erasure rate of the DRC messages. Each sector then sets a DRC Lock Bit for the AT in accordance with the evaluated erasure rate. In accordance with one embodiment, the DRC Lock Bit set to one value, e.g., one ("in-lock"), indicates that the DRC erasure rate is acceptable; the DRC Lock Bit set to a second value, e.g., zero ("out-of-lock"), indicates that the DRC erasure rate is unacceptable. The serving sector then sends the DRC Lock Bit to the AT in a message on a control channel. The control channel for a communication system in accordance with the IS-856 standard is transmitted periodically every 426 ms.

In accordance with one embodiment, the decision whether to re-point is made in accordance with the DRC Lock Bit. The decision to which of the non-serving sectors to re-point is made in accordance with the above-described RPC method. The non-serving sectors are assigned to different groups (Group 1 and Group 2) in accordance to their filtered RPC mean and T1_RPC, T2_RPC. The AT first ascertains those non-serving sectors that belong to Group 1. If at least one of the non-serving belong to Group 1, the AT re-points the DRC to the sector from this group with the highest credits. If none of the non-serving sectors belong to Group 1, the AT ascertains those non-serving sectors that belong to Group 2. If at least one of the non-serving belong to Group 2, the AT re-points the DRC to the sector from this group with the highest credits. In accordance with one embodiment, if two or more non-serving sectors have equal credits, a sector with the highest quality reverse link is selected. If none of the non-serving sectors belongs to either group, the AT continues pointing its DRC to the current serving sector. One skilled in the art recognizes that the assignment to different groups has been described as a concept for pedagogical purposes. In an implementation in accordance with one embodiment, the "assignment" occurs as the filtered RPC mean of each sector is evaluated. The combined Message Based DRC Lock and filtered RPC method is described in details below.

Access Point Processing

The processing method at the sector in accordance with one embodiment comprises three phases. In the first phase, mapping a DRC Erasure and/or a valid DRC to a binary form generates a DRC Erasure Bit. In the second phase, processing the DRC Erasure Bits generates a DRC erasure rate. In the third phase, sampling the processed DRC erasure rate every control channel period generates a DRC Lock Bit.

Figure 15:
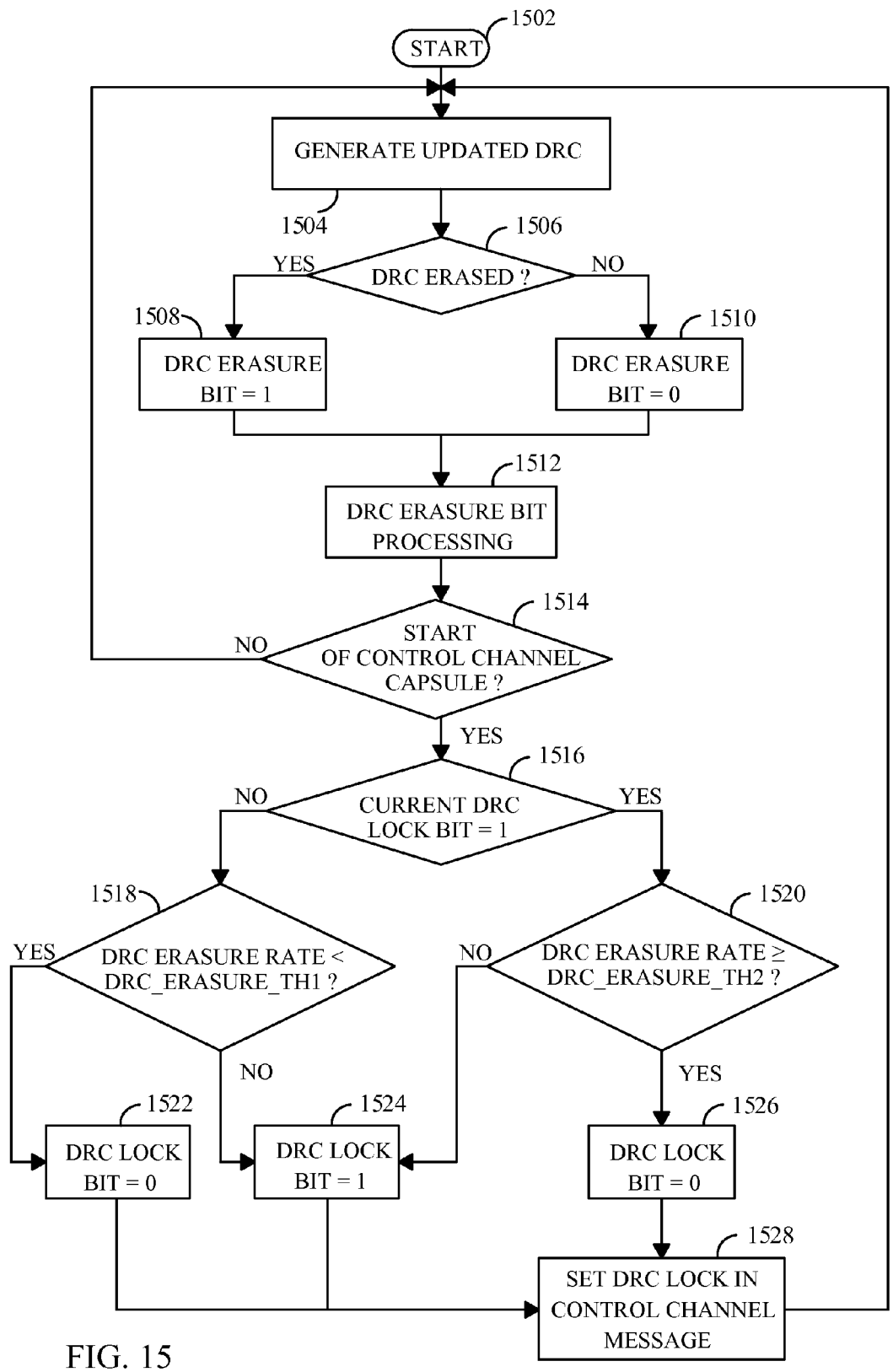
FIG. 15 illustrates an Access Point processing of a data request (DRC) for a combined Message Based DRC Lock and filtered RPC method in accordance with one embodiment.

The above-described phases one and two are repeated every time-slot by every sector in the AT active set, and is illustrated in FIG. 15. The method starts in step 1502. The method continues in step 1504.

In step 1504, an updated DRC is generated. The method continues in step 1506.

In step 1506, the updated DRC is tested. If the DRC was erased, the method continues in step 1508, otherwise, the method continues in step 1510.

In step 1508, the DRC Erasure Bit is assigned a value of one. The method continues in step 1512.

In step 1510, the DRC Erasure Bit is assigned a value of zero. The method continues in step 1512.

In step 1512, the DRC Erasure Bit is processed to generate a DRC erasure rate. In accordance with one embodiment, the processing comprises filtering by a filter with a pre-determined time constant. In accordance with one embodiment, the filter is realized in a digital domain. The value of the pre-determined time constant is established in accordance with system simulation, by experiment or other engineering methods known to one of ordinary skills in the art as an optimum in accordance with:

reliability of an estimate ensuing from a choice of the time constant, and latency of an estimate ensuing from the choice of the time constant.

The method continues in step 1514.

In step 1514, the system time is tested to establish the beginning of a control channel capsule. If the test is positive, the method continues in step 1516, otherwise the method returns to step 1504.

Steps 1516 through 1526, introduce hysteresis rules for generating the DRC Lock Bit. The hysteresis is introduced to avoid rapid re-pointing when the channel SINR varies rapidly. The hysteresis rules are as follows:

If the DRC Lock Bit is currently set to one, then the filtered DRC erasure rate must exceed first DRC erasure threshold (DRC_Erasure_Th2) for the DRC Lock Bit to be set to zero; and If the DRC Lock Bit is currently set to zero, then the Filtered DRC Erasure rate has to be below a second pre-determined DRC erasure threshold (DRC_Erasure_Th1) for the DRC Lock to be set to one.

In accordance with one embodiment, the values DRC_Erasure_Th1 and DRC_Erasure_Th2 are pre-determined in accordance with the communication system simulation, by experiment or other engineering methods known to one of ordinary skills in the art. In another embodiment, the values DRC_Erasure_Th1 and DRC_Erasure_Th2 are changed in accordance with the change of the conditions of the communication link. In either embodiment, the values of DRC_Erasure_Th1 and DRC_Erasure_Th2 are selected to optimize the following requirements to:

minimize the dead-zone (when the DRC Lock Bit is not updated); and transmit the most current reverse link channel state information to the AT.

In step 1516, the current DRC Lock Bit value is compared to 1. If the DRC Lock Bit value equals 1, the method continues in step 1520, otherwise, the method continues in step 1518.

In step 1518, the DRC erasure rate is compared to the DRC_Erasure_Th1. If the DRC erasure rate is less than the DRC_Erasure_Th1, the method continues in step 1524, otherwise, the method continues in step 1522.

In step 1520, the DRC erasure rate is compared to the DRC_Erasure_Th2. If the DRC erasure rate is less than the DRC_Erasure_Th2, the method continues in step 1524, otherwise, the method continues in step 1526.

In step 1522, the DRC Lock Bit value is set to 0. The method continues in step 1528.

In step 1524, the DRC Lock Bit value is set to 1. The method continues in step 1528.

In step 1526, the DRC Lock Bit value is set to 0. The method continues in step 1528.

In step 1528, the DRC Lock Bit is set at the appropriate position of the control channel message. The method returns to step 1504.

Access Terminal Processing

At the AT, the DRC Lock Bit is recovered from the forward link of the serving sector. A re-pointing decision is made in accordance with the value of the DRC Lock Bit. If the DRC Lock Bit is "in-lock," the reverse link from the AT to the serving sector is of sufficient quality; consequently, no re-pointing is mandated. If the DRC Lock Bit is "out-of-lock," the reverse link from the AT to the sector is of insufficient quality and a re-pointing may be required. In accordance with one embodiment, the decision to re-point to a non-serving sector is made if a non-serving sector provides higher throughput in accordance with the non-serving sector's FL_SINR and reverse link quality metric, as determined by the non-serving sector's credits. In accordance with one embodiment, the relationship between the filtered RPC mean and the DRC erasure rate is used to scale (de-rate) the forward link SINR to reflect the condition of the reverse link. The de-rated forward link SINR is then used to accumulate the credits for the non-serving sector. Consequently, the Initialization phase in accordance with this embodiment is carried out according to FIG. 5 and accompanying text.

Similarly, the Credit Accumulation phase is carried out according to FIG. 10 and accompanying text with the following modification. In step 1004, the filtered RPC mean (RPC_mean) identified by the variable Count is updated. As described, the filtered RPC mean is obtained by filtering received RPC bits by a filter with a pre-determined time constant. Referring to FIG. 14, if the filtered RPC mean fluctuates around the T2_RPC, the sector classification between B1, C1 and B2, C2 changes rapidly, which increases likelihood that a sector, which belongs to B2, C2 is classified as B1, C1 and vice versa. Because the forward link throughput is negatively affected by incorrect classification, in accordance with one embodiment, the transition between the between B1, C1 and B2, C2 is controlled. This can be accomplished, for example, by generating the filtered RPC mean using different time constants for sectors in B1, C1 and B2, C2. Consequently, in accordance with another embodiment, the time constant for sectors in B1, C1 is smaller than the time constant for sectors in B2, C2, which results in a contraction of regions B and C without delaying transition from Group 1 to 2.

To carry out the decision to re-point, the AT first ascertains those non-serving sectors that have credits greater than or equal to a pre-determined threshold (NS_Th). In accordance with one embodiment, the pre-determined threshold is equal to a fraction of the Soft/Softer handoff delay. If at least one of the non-serving sectors satisfies this condition, the AT re-points the DRC to the sector with the highest credits. In accordance with one embodiment, if two or more non-serving sectors have equal credits, a sector with the highest quality reverse link is selected. The quality of the reverse link is determined in accordance with the reverse link's filtered RPC mean. In another embodiment, if two or more non-serving sectors have equal credits, a sector with the highest quality forward link is selected.

If none of the non-serving sectors has credits greater than or equal to a pre-determined threshold (NS_Th), in accordance with one embodiment, the AT continues pointing its DRC to the current serving sector. In accordance with another embodiment, the AT further determines, whether at least one non-serving sector has accumulated credits greater than a pre-determined threshold (Hoff_Th). In accordance with one embodiment, if two or more non-serving sectors have equal accumulated credits greater than the Hoff_Th, a sector with the highest quality reverse link is selected. The quality of the reverse link is determined in accordance with the reverse link's filtered RPC mean. In another embodiment, if two or more non-serving sectors have equal accumulated credits greater than the Hoff_Th, a sector with the highest quality forward link is selected. If none of the non-serving sectors has credits greater than or equal to the Hoff_Th, the AT continues pointing its DRC to the current serving sector.

Figure 16:
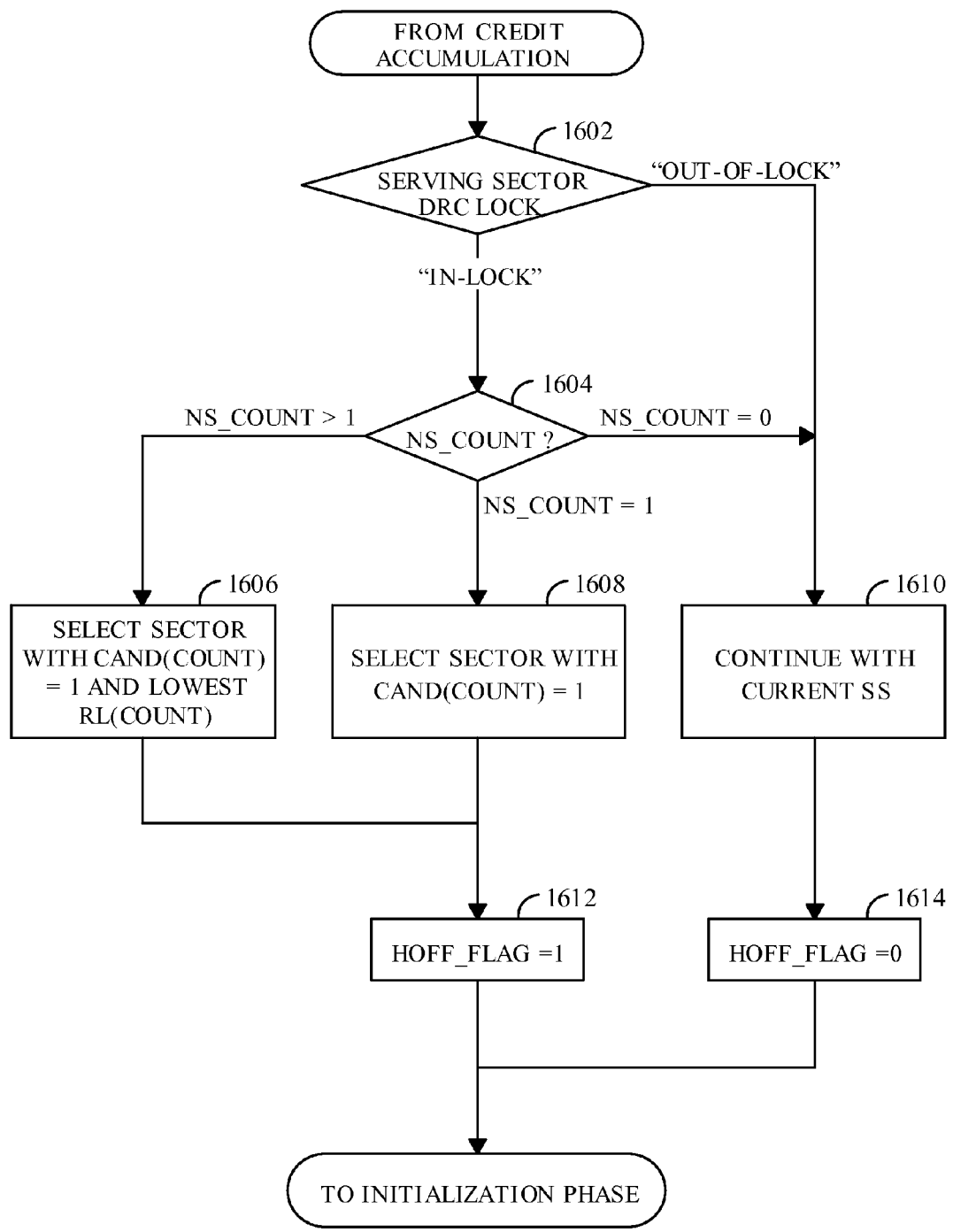
FIG. 16 illustrates a Decision phase at the Access Terminal for the combined Message Based DRC Lock and filtered RPC method in accordance with one embodiment.

FIG. 16 illustrates a flow diagram of the decision phase in accordance with above described embodiments.

In step 1602, the received DRC Lock Bit from the current serving sector is tested. If the DRC Lock Bit of the current serving sector is "out-of-lock" the method continues in step 1604, otherwise, the method continues in step 1610.

In step 1604, the value of the variable NS_Count is ascertained. If the value of the variable NS_Count is greater than 1, the method continues in step 1606. If the value of the variable NS_Count is equal to 1, the method continues in step 1608; otherwise, the method continues in step 1610.

In step 1606, the AT re-points the DRC to the candidate sector identified by the variable Count that has the highest quality reverse link in accordance with the sector's reverse link's filtered RPC mean. Alternatively, the AT re-points the DRC to the candidate sector identified by the variable Count that has the highest quality forward link (not shown). The method continues in step 1612.

In step 1608, the AT re-points the DRC to the candidate sector identified by the variable Cand(Count)=1. The method continues in step 1612.

In step 1610, the AT continues with the current serving sector. The method continues in step 1614.

In step 1612, the variable Hoff_Flag is set to 1. The method returns to the Initialization phase.

In step 1614, the variable Hoff_Flag is set to 0. The method returns to the Initialization phase.

FIG. 16, describes only the embodiment, in accordance to which the AT continues pointing its DRC to the current serving sector if none of the non-serving sectors has credits greater than or equal to the NS_Th.

Re-Pointing with a Modified Set Management

In a wireless communication system, an imbalance may occur between a forward link and a reverse link. Imbalance occurs, when a forward link quality metric from a first sector is greater than the forward link quality metric from a second sector, and a reverse link quality metric from a first sector is less than a reverse link quality metric from a second sector. It has been observed that low levels of imbalance, e.g., less than 1 dB are almost always present in a communication system of FIG. 1. This level of imbalance appears to have little impact on either the forward link requested/served rate or on the DRC Erasure rate on the reverse link. Consequently, such an imbalance is accepted because the cost, e.g., outage associated with re-pointing DRC's in a dynamic communication system environment (changing channel conditions, AT mobility etc), far exceeds the small penalty in forward link sector throughput that may result.

As the imbalance increases, the sector with the better forward link quality metric has a higher DRC erasure rate. Consequently, the advantage of an AT pointing it's DRC to a sector with a better forward link quality metric is reduced because the DRC erasure rate to the sector with the better forward link quality metric may be so large as to reduce the forward link throughput significantly. In an extreme case, if the DRC Erasure Rate is 100%, regardless of the forward link quality metric, the AT will not be served. On the other hand, re-pointing the AT's DRC to a sector with a better reverse link quality metric may not improve the forward link throughput because the sector's forward link quality metric is reduced.

Because the actual forward link throughput that an AT achieves is a function of the data queues to the AT and forward link scheduling method, the forward link throughput cannot be known apriori. Therefore, the re-pointing method attempts to select the best sector assuming that the data queues are full and that the scheduling method would select the AT for service. The re-pointing method further considers that from an AT standpoint, imbalance is an issue only if it degrades the AT throughput by one rate on the forward link. For example, consider a static channel with the following conditions:

Sector 1 forward link quality metric FL1_SINR is 3 dB higher than sector 2 forward link quality metric FL2_SINR, therefore, the forward link of sector 1 can support 614 kB rate, and the forward link of sector 2 can support 307 kB rate.

Reverse link quality metric, as measured by the Reverse Link Pilot channel SINR (Ecp/Nt), from sector 2 RL2_Ecp/Nt is 3 dB lower than reverse link quality metric from sector 1 RL1_Ecp/Nt, therefore, a filtered RPC mean of RL1=0.9, a filtered RPC mean of RL2 is 0.1616. The corresponding DRC Erasure Rate of RL1 is 0.8, DRC Erasure Rate of RL2 is 0.1.

If the AT points DRC to sector 1 it receives a higher throughput if the AT is served, but the likelihood of it being served is less than or equal to 20% (Erasure Rate of RL1 is 0.8). If the AT points DRC to sector 2 it receives a lower throughput if the AT is served, but the likelihood of it being served is less than or equal to 90% (Erasure Rate of RL2 is 0.1). Consequently, the throughput from sector 1 is 614 kB*0.2=122.8 kB, and the throughput from sector 2 is 307 k*0.9=276.3 k. Clearly, the AT gains from pointing its DRC to sector 2.

Let us assume that in a communication system of FIG. 1, the forward link quality metric 106(1) is greater than the quality metric of the forward link 106(2), and the quality metric of the reverse link 108(1) is less than the quality metric of the reverse link 108(1), causing a severe imbalance as described above. As has been discussed, the AT utilizes a pre-determined add threshold and a pre-determined drop threshold for managing the AT's active set. In accordance with one embodiment, if the SINR of the forward link 106(2) stays below the pre-determined drop threshold for a period equal to or greater than a pre-determined time period, the AT requests that the sector at AP 102 be removed from the AT active set. Because the SINR of the reverse link 108(1) is small, a sector at the AP 100 requests the AT via RPC commands to increase the AT transmit power. Consequently, the AT transmits more power than average, which has an adverse impact on reverse link capacity. Furthermore, because the sector at AP 102 was removed from the AT active set, the above-described re-pointing method cannot be used.

Therefore, in one embodiment, the set management method is implemented at the sectors. When the AT determines that a pilot signal for a sector, e.g., the sector at AP 102 should be removed from the AT active set, the AT sends one request via a Route Update message to the AP 102 to remove the sector from the AT active set. A change of the active set of the AT in response to the Route Update message are at the discretion of the AP. In order to alleviate the severe imbalance the AP's set management method may determine that a reverse link associated with the forward link of the sector at AP 102 has a sufficient quality metric, and deny the request. The AP's set management method retains the information of the AT request. Thus, if the associated reverse link SINR deteriorates, the AP's set management method may delete the particular pilot signal from the active set at a later instant even prior to another Route Update message from the AT where the another Route Update message is sent on detecting other potential changes to the active set at the AT.

In other embodiment, the set management can be used to affect a grade of service. For example, the AP may decide to exclude users whose service is below a certain grade by adjusting the existing setting of the drop threshold. The drop threshold is adjusted in accordance with the minimal forward link SINR threshold at which a desired data rate can be decoded. In accordance with one embodiment, for decoding of the lowest data rate equal to 38.4 kbps, the minimal forward link SINR threshold equals $-11.5$ dB. Therefore, it is beneficial to continue tracking the forward link at SINR around $-12$ dB, accordingly the modified the pre-determined drop threshold equals $-12$ dB.

One skilled in the art will appreciate that the effects of the link imbalance and the method of adjusting of the pre-determined drop threshold has been described with respect to a communication system of FIG. 1 for pedagogical purposes only. The effects of link imbalance affect every communication system utilizing a soft handoff, and can be alleviated by the method disclosed as long as the management of sectors, equivalent to management of active set, is employed by the communication system. Consequently, such communication system includes, but is not limited to, systems in accordance with the IS-95 standards, the W-CDMA standard, and the IS-2000 standard.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter, a receiver and any other appropriate blocks of the AT and/or AP.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. A method for directing communication between a subscriber station and a plurality of sectors in a data communication system, comprising:

determining at the subscriber station a forward link quality metric for each sector in a subscriber station's list;

determining a forward link de-rating value for each sector in the subscriber station's list, each forward link quality metric being scaled by a corresponding forward link de-rating value to generate a de-rated forward link quality metric for each sector in the subscriber station's list;

incrementing credits for each sector in the subscriber station's list except a sector currently serving the subscriber station if a first condition is satisfied, wherein the first condition is based on a comparison between a sector's de-rated forward link quality metric and a de-rated forward link quality metric of the currently serving sector;

decrementing credits for each sector in the subscriber station's list except the sector currently serving the subscriber station if a second condition is satisfied, wherein the second condition is based on a comparison between a sector's de-rated forward link quality metric and the de-rated forward link quality metric of the currently serving sector; and directing communication between the subscriber station and one sector from the sectors in the subscriber station's list, wherein the one sector has accumulated credits greater than a pre-determined threshold.

2. The method as claimed in claim 1, wherein said data communication system comprises a wireless data communication system.

3. The method as claimed in claim 1, wherein said determining at the subscriber station a quality metric of a forward link for each sector in the subscriber station's list comprises measuring a signal-to-noise-and-interference-ratio of the forward link.

4. The method as claimed in claim 3, wherein said measuring a signal-to-noise-and-interference-ratio of the forward link comprises measuring a signal-to-noise-and-interference-ratio of a pilot signal on the forward link.

5. The method as claimed in claim 4, wherein said measuring a signal-to-noise-and-interference-ratio of a pilot signal on the forward link comprises measuring a signal-to-noise-and-interference-ratio of a non-continuous pilot signal on the forward link.

6. The method as claimed in claim 1, wherein said determining a forward link de-rating value for each sector in the subscriber station's list comprises:

ascertaining at the subscriber station a first signal value at a position in a first channel of the forward link for each sector in the subscriber station's list;

processing at the subscriber station said ascertained first signal value for each sector in the subscriber station's list; and determining at the subscriber station the forward link de-rating value in accordance with said processed first signal value for each sector in the subscriber station's list.

7. The method as claimed in claim 6, wherein said ascertaining at the subscriber station a first signal value at a position in a first channel of the forward link for each one sector in the subscriber station's list comprises ascertaining at the subscriber station a reverse power control bit at a reverse power control channel of the forward link for each sector in the subscriber station's list.

8. The method as claimed in claim 6, wherein said determining at the subscriber station the forward link de-rating value in accordance with said processed first signal value for each sector in the subscriber station's list comprises:

determining at the subscriber station a first reverse link quality metric in accordance with a pre-determined relationship between said processed first signal value and the first reverse link quality metric; and determining at the subscriber station the forward link de-rating value in accordance with a pre-determined relationship between the first reverse link quality metric and the forward link de-rating value.

9. An apparatus for directing communication between a subscriber station and a plurality of sectors in a data communication system, comprising:

means for determining at the subscriber station a forward link quality metric for each sector in a subscriber station's list;

means for determining a forward link de-rating value for each sector in the subscriber station's list, each forward link quality metric being scaled by a corresponding forward link de-rating value to generate a de-rated forward link quality metric for each sector in the subscriber station's list;

means for incrementing credits for each sector in the subscriber station's list except a sector currently serving the subscriber station if a first condition is satisfied, wherein the first condition is based on a comparison between a sector's de-rated forward link quality metric and a de-rated forward link quality metric of the currently serving sector;

means for decrementing credits for each sector in the subscriber station's list except the sector currently serving the subscriber station if a second condition is satisfied, wherein the second condition is based on a comparison between a sector's de-rated forward link quality metric and the de-rated forward link quality metric of the currently serving sector; and means for directing communication between the subscriber station and one sector from the sectors in the subscriber station's list, wherein the one sector has accumulated credits greater than a pre-determined threshold.

10. An apparatus for directing communication between a subscriber station and a plurality of sectors in a data communication system, comprising:

a processor; and a storage medium coupled to the processor and containing a set of instructions executable by the processor to:

determine at the subscriber station a forward link quality metric for each sector in a subscriber station's list;

determine a forward link de-rating value for each sector in the subscriber station's list, each forward link quality metric being scaled by a corresponding forward link de-rating value to generate a de-rated forward link quality metric for each sector in the subscriber station's list;

increment credits for each sector in the subscriber station's list except a sector currently serving the subscriber station if a first condition is satisfied, wherein the first condition is based on a comparison between a sector's de-rated forward link quality metric and a de-rated forward link quality metric of the currently serving sector;

decrement credits for each sector in the subscriber station's list except the sector currently serving the subscriber station if a second condition is satisfied, wherein the second condition is based on a comparison between a sector's de-rated forward link quality metric and the de-rated forward link quality metric of the currently serving sector; and direct communication between the subscriber station and one sector from the sectors in the subscriber station's list, wherein the one sector has accumulated credits greater than a pre-determined threshold.

11. The apparatus as claimed in claim 10, wherein said data communication system comprises a wireless data communication system.

12. The apparatus as claimed in claim 10, wherein said processor is configured to determine at the subscriber station a quality metric of a forward link for each sector in the subscriber station's list by executing a set of instructions to measure a signal-to-noise-and-interference-ratio of the forward link.

13. The apparatus as claimed in claim 12, wherein said processor is configured to measure a signal-to-noise-and-interference-ratio of the forward link by executing a set of instructions to measure a signal-to-noise-and-interference-ratio of a pilot signal on the forward link.

14. The apparatus as claimed in claim 10, wherein said processor is configured to determine a forward link de-rating value of each sector in the subscriber station's list by executing a set of instructions to:
   ascertain at the subscriber station a first signal value at a position in a first channel of the forward link for each sector in the subscriber station's list;
   process at the subscriber station said ascertained first signal value for each sector in the subscriber station's list; and
   determine at the subscriber station the forward link de-rating value in accordance with said processed first signal value for each sector in the subscriber station's list.

15. The apparatus as claimed in claim 14, wherein said processor is configured to ascertain at the subscriber station a first signal value at a position in a first channel of the forward link for each sector in the subscriber station's list by executing a set of instructions to ascertain at the subscriber station a reverse power control bit at a reverse power control channel of the forward link for each sector in the subscriber station's list.

16. The apparatus as claimed in claim 14, wherein said processor is configured to process at the subscriber station said ascertained first signal value for each sector in the subscriber station's list by executing a set of instructions to filter said ascertained signal value by a filter with a pre-determined time constant.

17. The apparatus as claimed in claim 10, wherein the first condition tests if the de-rated forward link quality metric of the sector is greater than the de-rated forward link quality metric for a sector currently serving the subscriber station modified by the predetermined threshold, and the second condition tests if the de-rated forward link quality metric of the sector is less than the de-rated forward link quality metric for the sector currently serving the subscriber station modified by the predetermined threshold.

18. A tangible, non-transitory storage medium comprising a set of instructions stored thereon executable to:
   determine at the subscriber station a forward link quality metric for each sector in a subscriber station's list;
   determine a forward link de-rating value for each sector in the subscriber station's list, each forward link quality metric being scaled by a corresponding forward link de-rating value to generate a de-rated forward link quality metric for each sector in the subscriber station's list;
   increment credits for each sector in the subscriber station's list except a sector currently serving the subscriber station if a first condition is satisfied, wherein the first condition is based on a comparison between a sector's de-rated forward link quality metric and a de-rated forward link quality metric of the currently serving sector;
   decrement credits for each sector in the subscriber station's list except the sector currently serving the subscriber station if a second condition is satisfied, wherein the second condition is based on a comparison between a sector's de-rated forward link quality metric and the de-rated forward link quality metric of the currently serving sector; and
   direct communication between the subscriber station and one sector from the sectors in the subscriber station's list, wherein the one sector has accumulated credits greater than a pre-determined threshold.

\* \* \* \* \*